(12) United States Patent
Nakamura et al.

(10) Patent No.: US 7,342,870 B2
(45) Date of Patent: Mar. 11, 2008

(54) POSITION ADJUSTMENT APPARATUS, OPTICAL PICKUP APPARATUS AND POSITION ADJUSTMENT METHOD

(75) Inventors: Masahiro Nakamura, Higashihiroshima (JP); Akiho Yoshizawa, Higashihiroshima (JP); Kenji Hatazawa, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 475 days.

(21) Appl. No.: 10/857,770

(22) Filed: May 28, 2004

(65) Prior Publication Data

US 2005/0025030 A1 Feb. 3, 2005

(30) Foreign Application Priority Data

May 30, 2003 (JP) ............................ P2003-154130

(51) Int. Cl.
G11B 7/00 (2006.01)
G11B 7/08 (2006.01)
G11B 7/09 (2006.01)
G11B 7/085 (2006.01)

(52) U.S. Cl. .................. 369/122; 369/44.14; 720/681; 720/658

(58) Field of Classification Search ................ 369/121, 369/122, 44.14; 720/681, 658; 359/822, 359/820

See application file for complete search history.

(56) References Cited

U.S. PATENT DOCUMENTS

| | | | | |
|---|---|---|---|---|
| 5,317,552 A | * | 5/1994 | Yamasaki | ............... 369/44.14 |
| 5,592,459 A | * | 1/1997 | Kasahara | ................. 369/44.21 |
| 6,026,064 A | * | 2/2000 | Izumi et al. | .............. 369/44.22 |
| 6,159,304 A | * | 12/2000 | Noguchi et al. | ............... 148/23 |
| 6,377,521 B1 | * | 4/2002 | Kijima et al. | ............ 369/44.23 |
| 6,778,568 B1 | * | 8/2004 | Fukuda et al. | ................ 372/36 |
| 7,006,410 B2 | * | 2/2006 | Osada et al. | ................ 369/44.14 |
| 2004/0117809 A1 | * | 6/2004 | Murata et al. | ............... 720/649 |
| 2005/0063279 A1 | * | 3/2005 | Song et al. | .................... 369/99 |
| 2005/0249055 A1 | * | 11/2005 | Ochi et al. | ............... 369/44.14 |
| 2005/0265142 A1 | * | 12/2005 | Mitsumori et al. | ...... 369/44.14 |

FOREIGN PATENT DOCUMENTS

| JP | 05-081693 A | 4/1993 |
|---|---|---|
| JP | 05-166192 A | 7/1993 |
| JP | 09-063064 A | 3/1997 |
| JP | 2000-036117 | 2/2000 |
| JP | 2000-276755 | 10/2000 |

(Continued)

*Primary Examiner*—Andrea Wellington
*Assistant Examiner*—Adam B Dravininkas
(74) *Attorney, Agent, or Firm*—Morrison & Foerster LLP

(57) ABSTRACT

A chuck portion provided to keep a fixed positional relation with respect to a housing, holds a light source unit detachably. This chuck portion is displaced from an advanced position to a retracted position to displace the light source unit which is in a provisional position with respect to the housing, in a direction being away from the housing along a reference axis and the light source unit is retracted from the housing. In a state where the light source unit which is in this position is held by the chuck portion, the light source unit is slid and displaced in a direction crossing the reference axis with respect to the housing, angularly displaced about the reference axis and an axis crossing the reference axis, and then fixed to the housing.

18 Claims, 21 Drawing Sheets

FOREIGN PATENT DOCUMENTS

| | | |
|---|---|---|
| JP | 2000-331351 A | 11/2000 |
| JP | 2001-144364 A | 5/2001 |
| JP | 2002-074684 | 3/2002 |
| JP | 2002-342945 | 11/2002 |
| JP | 2002-367188 A | 12/2002 |
| JP | 2003-045041 A | 2/2003 |
| JP | 2003-187461 A | 4/2003 |
| JP | 2003187461 A * | 7/2003 |

* cited by examiner

POSITION ADJUSTMENT APPARATUS, OPTICAL PICKUP APPARATUS AND POSITION ADJUSTMENT METHOD

BACKGROUND OF THE INVENTION

1. Field of the Invention

The present invention relates to an optical pickup apparatus which includes a light source unit and irradiates light from the light source unit on a recording medium to thereby record or reproduce information, and a position adjustment apparatus and a position adjustment method for adjusting a position of the light source unit.

2. Description of the Related Art

FIG. 32 is a sectional view showing an optical pickup apparatus 1 in one related art. In one related art, for example, disclosed in the Japanese Unexamined Patent Publication JP-A 2002-342945, a laser beam from a semiconductor laser 2 is guided to an objective lens 4 via a collimator lens 3 opposed to the semiconductor lens 2. The semiconductor lens 2 is held by a laser holder 5, and a spherical seat 6 is interposed between this laser holder 5 and a housing 7.

The laser holder 5 and the spherical seat 6 are brought into abutment against each other on surfaces 5a and 6a which are formed in a spherical shape. In addition, the spherical seat 6 is brought into abutment against the housing 7 on the opposite side of the laser holder 5. The spherical seat 6 and the housing 7 are brought into abutment against each other on surfaces 6b and 7a which are formed in a plane shape. The surfaces 6b and 7a of the spherical seat 6 and the housing 7 are perpendicular to an axis of the collimator lens 3.

By sliding the spherical seat 6 with respect to the housing 7, a position of the semiconductor laser 2 with respect to the housing 7 is displaced such that an axis L3 of the collimator lens 3 passes a light-emitting portion 2a of the semiconductor laser 2. In addition, by sliding the laser holder 5 with respect to the spherical seat 6, tilt adjustment for adjusting a tilt of an optical axis of the laser beam with respect to the axis L3 of the collimator lens 3 is performed.

FIG. 33 is a sectional view showing an optical pickup apparatus 10 in another related art. In another related art, for example, disclosed in the Japanese Unexamined Patent Publication JP-A 2000-36117, a laser beam from a semiconductor laser 11 is guided to an objective lens 13 via a coupling lens 12 opposed to the semiconductor laser 11. The optical pickup apparatus 10 includes a laser holder 14, in which the semiconductor laser 11 is provided, and a housing 17, which includes a housing main body 15 and a main body side portion 16. The laser holder 14 and the housing main body 15 are brought into abutment against each other on surfaces 14a and 15a which are formed along one imaginary cylindrical surface.

The housing main body 15 is aligned with respect to the main body side portion 16 in advance such that an axis of the one imaginary cylindrical surface is perpendicular to an axis of the coupling lens 12 in a state in which the laser holder 14 is brought into abutment against the housing main body 15. In addition, an engagement portion (not shown), which engages with a rotation jig such as an eccentric pin, is provided in the laser holder 14. This engagement portion is engaged with the rotation jig. By operating the rotation jig, the laser holder 14 is slid with respect to the housing main body 15. Consequently, the optical axis of the laser beam is angularly displaced around the axis of the one imaginary cylindrical surface, and the tilt adjustment is performed.

In the above-mentioned the related art, in order to adjust a position of the optical axis of the laser beam, the two members of the laser holder 5 and the spherical seat 6 are displaced with respect to the housing 7. Moreover, in the above-mentioned another related art, in order to adjust a position of the optical axis of the laser beam, an adjustment mechanism, which slides and adjusts the laser holder 14 with respect to the housing 17 by engaging the rotation jig and the engagement portion of the laser holder 14 to operate the rotation jig, is used. Therefore, in the respective related arts, adjustment work and a constitution of the apparatus are complicated, which also makes adjustment equipment complicated. In particular, in the tilt adjustment, the surfaces 5a and 6a of a spherical shape and the surfaces 14a and 15a along one imaginary cylindrical surface are brought into sliding contact with each other. In such a constitution, in order to realize smooth tilt adjustment, depending upon curvatures of the respective surfaces, it is necessary to change the constitution by, for example, forming at least one of the members, which are slid with respect to each other, of a material with a high sliding property or applying surface processing to at least one of the members such that a high sliding property can be obtained. This requires time and labor.

In addition, in the case in which the tilt adjustment is performed, in order to align the optical axis of the laser beam with the axes of the lenses opposed to the light sources 2 and 11, it is desired that the semiconductor lasers 2 and 11 are arranged in positions where the axes of the opposed lenses pass the light-emitting portions 2a and 11a. However, the light-emitting portions 2a and 11a are not always in ideal positions in terms of design depending upon component accuracy and the like. In particular, in the above-mentioned another related art, in the case in which a position of the light-emitting portion 11a deviates, the optical axis and the axis of the coupling lens 12 cannot be aligned.

Moreover, in adjusting a position of the optical axis, in the above-mentioned related art, the two members, the laser holder 5 and the spherical seat 6, are required with respect to the housing 7 to be a reference. In the above-mentioned another related art, the two members, the laser holder 14 and the housing main body 15, are required with respect to the main body side portion 16 to be a reference. Therefore, in addition to the complicated adjustment work, the number of components increases, which causes. an increase in costs.

SUMMARY OF THE INVENTION

It is an object of the invention to provide a position adjustment apparatus, an optical pickup apparatus, and a position adjustment method which can simplify structures of the apparatuses and facilitate position adjustment of an optical axis.

The invention provides a position adjustment apparatus for adjusting a position of a light source unit of an optical pickup apparatus which includes a housing and the light source unit fixed to the housing and records or reproduces information by irradiating a recording medium with light from the light source unit, the position adjustment apparatus comprising:

a jig having a chuck portion provided to keep a fixed positional relation with respect to the housing, for detachably holding the light source unit, wherein the chuck portion is provided so as to be displaceable over an advanced position where the chuck portion is capable of holding the light source unit, which is arranged in a predetermined provisional position with respect to the housing, and a retracted position where the chuck portion is retracted in a direction in which the chuck portion is away from the housing along a predetermined reference axis, with respect to the advanced position, and so as to be capable of, in a state in which the chuck portion is in the retracted position, sliding and displacing the light source unit in a direction crossing the reference axis with respect to the housing and angularly displacing the light source unit around the reference axis and an axis crossing the reference axis.

In accordance with the invention, the jig has the chuck portion, and this chuck portion is provided to keep a fixed positional relation with respect to the housing. The chuck portion detachably holds the light source unit. The chuck portion is provided so as to be displaceable over the advanced position where the chuck portion is capable of holding the light source unit, which is arranged in the predetermined provisional position with respect to the housing, and the retracted position where the chuck portion is retracted in a direction in which the chuck portion is away from the housing along the predetermined reference axis, with respect to the advanced position. Moreover, the chuck portion is provided so as to be capable of, in a state in which the chuck portion is in the retracted position, sliding and displacing the light source unit in a direction crossing the reference axis with respect to the housing and angularly displacing the light source unit around the reference axis and an axis crossing the reference axis.

A positional relation between the chuck portion holding the light source unit and the housing is adjusted in this way, whereby a positional relation between the light source unit and the housing can be adjusted without adjusting a positional relation between the chuck portion and the jig or a positional relation between the chuck portion and the light source unit. Consequently, adjustment work for a position of an optical axis of light form the light source unit can be facilitated.

Moreover, since it is unnecessary to adjust a position of an optical axis in a state in which the light source unit is brought into contact with the housing, for example, it is unnecessary to form surfaces opposed to each other of the light source unit and the housing as curved surfaces requiring high processing accuracy, and structures of the light source unit and the housing can be simplified. In addition, since the optical axis is adjusted to a desired position, recording or reproduction of information by the optical pickup apparatus can be performed preferably.

In addition, in the invention, the retracted position is in a recording and reproducing position which is set with respect to the housing in advance, and a distance between the recording medium and the light source unit is a distance at the time when recording or reproduction of information is performed.

In accordance with the invention, the retracted position is in the recording and reproducing position which is set with respect to the housing in advance, and the distance between the recording medium and the light source unit is set so as to be the distance at the time when recording or reproduction of information is performed. By displacing the light source unit following displacement of the chuck portion to the retracted position, in addition to the position adjustment of an optical axis, a spot shape of light can be adjusted such that light from the light source unit is narrowed down on a recording medium. Consequently, the adjustment work of a position of the light source unit can be further facilitated.

In addition, in the invention, the position adjustment apparatus further comprises fixing means for fixing the light source unit which is held by the chuck portion in the retracted position, to the housing using a fixing material.

In accordance with the invention, the light source unit which is held by the chuck portion in the retracted position, is fixed to the housing using the fixing material according to the fixing means. Consequently, the light source unit can be fixed to the housing in a state in which a position of the optical axis is adjusted, and an optical pickup apparatus with high convenience can be realized.

In addition, in the invention, the position adjustment apparatus further comprises pressing means for resiliently pressing the light source unit which is arranged in the provisional position with respect to the housing, toward the housing, wherein the chuck portion grips the light source unit which is resiliently pressed to the housing by the pressing means.

In accordance with the invention, the light source unit, which is arranged in the provisional position with respect to the housing, is resiliently pressed toward the housing by the pressing means. The chuck portion grips the light source unit which is resiliently pressed to the housing by the pressing means. Consequently, the light source unit is prevented from being pressed undesirably, and damage to and deformation of the light source unit can be prevented. Moreover, with the pressing means, the light source unit can be gripped by the chuck portion in a state in which positional deviation of the light source unit which is in the provisional position is prevented.

In addition, the invention provides an optical pickup apparatus, comprising:

a housing; and a light source unit fixed to the housing, the optical pickup apparatus recording or reproducing information by irradiating a recording medium with light from the light source unit, wherein the light source unit is, after being arranged in a provisional position, arranged in a position retracted from the housing using a jig having a chuck portion provided to keep a fixed positional relation with respect to the housing, for holding the light source unit, slid and displaced in a direction crossing a reference axis decided in advance in this position and displaced around the reference axis and an axis crossing the reference axis, and then fixed to the housing, and wherein the light source unit is provided with adjustment positioning means for positioning the light source unit with respect to the chuck portion.

In accordance with the invention, the optical pickup apparatus includes a housing and a light source unit held in the housing. This optical pickup apparatus can record or reproduce information by irradiating the recording medium with light from a light source. The light source unit is, after being arranged in the provisional position, arranged in a position retracted in a direction being away from the housing along a reference axis using the jig having a chuck portion provided to keep a fixed positional relation with respect to the housing, for holding the light source unit.

Moreover, the light source unit is slid and displaced in a direction crossing the reference axis and angularly displaced around the reference axis and an axis crossing the reference axis, and then fixed to the housing. The light source unit is provided with the adjustment positioning means for positioning the light source unit with respect to the chuck portion, and the light source unit is gripped by the chuck portion in a state in which the light source unit is positioned by this adjustment positioning means. By adjusting a positional relation between the chuck portion gripping the light source unit and the housing in this way, a positional relation between the light source unit and the housing can be adjusted without adjusting a positional relation between the chuck portion and the jig or a positional relation between the chuck portion and the light source unit. Consequently, adjustment work of a position of an optical axis of light from the light source unit can be facilitated.

In addition, since it is unnecessary to form surfaces opposed to each other of the light source unit and the housing as curved surfaces requiring high processing accuracy and to bring the surfaces into sliding contact with each other in order to adjust a tilt of an optical axis of the light source unit, a structure of the optical pickup apparatus can be simplified. Consequently, from the viewpoints of processing accuracy and the number of components, reduction in costs can be realized. Therefore, an optical pickup apparatus with high convenience can be realized.

In addition, in the invention, the adjustment positioning means is arranged in an area formed by projecting the housing on the reference axis.

In accordance with the invention, the adjustment positioning means is arranged in the area formed by projecting the housing on the reference axis. Consequently, the adjustment positioning means is prevented from being arranged in a position further protruding from the housing after the position adjustment of the optical axis. Therefore, an optical pickup apparatus with high convenience can be realized by, for example, preventing a thickness of the entire apparatus from increasing.

In addition, in the invention, the light source unit is provided with provisional position adjusting means for relatively positioning the light source unit and the housing.

In accordance with the invention, the light source unit is provided with the provisional position adjusting means for relatively positioning the light source unit and the housing. Since a position of the light source unit with respect to the housing is adjusted in a state in which the positions of the light source unit and the housing are decided relatively by the provisional position adjusting means in this way, workability at the time of adjustment can be improved.

In addition, in the invention, the provisional position adjusting means is arranged so as to extend in a direction along the reference axis.

In accordance with the invention, the provisional position adjusting means is arranged so as to extend in a direction along the reference axis. According to the provisional position adjusting means, the light source unit can be displaced in the direction along the reference axis to be arranged in the provisional position and the position retracted from the housing.

In addition, in the invention, the provisional position adjusting means is arranged so as to extend in a direction perpendicular to the reference axis.

In accordance with the invention, the provisional position adjusting means is arranged so as to extend in the direction perpendicular to the reference axis. According to the provisional position adjusting means, the light source unit can also be displaced in the direction along the reference axis to be arranged in the provisional position and the position retracted from the housing.

In addition, in the invention, the provisional position adjusting means positions the light source unit with respect to the housing such that the light source unit is angularly displaceable around the axis crossing the reference axis.

In accordance with the invention, the provisional position adjusting means positions the light source unit with respect to the housing such that the light source unit is angularly displaceable around the axis crossing the reference axis. Consequently, in a state in which the light source unit is positioned with respect to the housing, in addition to the displacement in the direction along the reference axis, the light source unit can be angularly displaced around the axis crossing the reference axis to adjust a position with respect to the housing.

In addition, in the invention, the light source unit includes a light source and a holder for holding the light source, and a heat transfer material made of a material with high heat transfer property is provided between the light source and the holder.

In accordance with the invention, the light source unit includes the light source and the holder for holding the light source. The heat transfer material made of the material with high heat transfer property is provided between the light source and the holder. Consequently, even in the case in which the light source is fixed in a state in which the light source is retracted from the housing, heat generated in the light source unit can be transmitted to the holder via the heat transfer material. In addition, in the case in which the light source unit is fixed to the housing with fixing means, for example, the heat transmitted to the holder as described above can be transmitted to the housing via the fixing means. Consequently, the generated heat can be discharged efficiently from the light source unit. In other words, a high heat radiation property can be attained.

In addition, in the invention, in at least one of the light source and the holder, a recessed portion in which the heat transfer material is fitted is formed in surface portions where the light source and the holder are opposed to each other.

In accordance with the invention, in at least one of the light source and the holder, the recessed portions in which the heat transfer material is fitted is formed in the surface portions where the light source and the holder are opposed to each other. By filling a material with high heat transfer property in the recessed portion, the material can be surely filled between the surface portions where the light source and the holder are opposed to each other, and an air layer which is generated between the surface portions can be eliminated. Consequently, the heat radiation property can be improved.

In addition, in the invention, the heat transfer material is made of a material with a viscosity of 200 Pa·s or more and 400 Pa·s or less at room temperature.

In accordance with the invention, the heat transfer material is made of a material with a viscosity of 200 Pa·s or more and 400 Pa·s or less at room temperature. Since the material with a low viscosity, which can be easily filled between the light source and the holder and has a satisfactory property of adhesion with the light source and the holder, is used in this way, the property of heat radiation by the heat transfer material can be improved.

In addition, in the invention, the optical pickup apparatus further comprises a heat radiation member of metal which is soldered to a ground terminal of the light source and brazed to the housing.

In accordance with the invention, the heat radiation member of metal is soldered to the ground terminal of the light source. This heat radiation member is further brazed to the housing. Consequently, heat generated in the light source can be transmitted to the housing via the heat radiation member, and the heat radiation property can be improved.

In addition, in the invention, after the light source unit is fixed to the housing with a position adjustment thereof with respect to the reference axis, the heat radiation member is brazed and fixed to the housing in a state in which the heat radiation member is soldered to the ground terminal of the light source.

In accordance with the invention, after the light source unit is fixed to the housing with the position adjustment thereof with respect to the reference axis, the heat radiation member is brazed and fixed to the housing in a state in which the heat radiation member is soldered to the ground terminal of the light source. Since the heat radiation member is brazed to the housing after the light source unit is fixed to the housing, the heat radiation member can be brazed to the housing such that an undesirable external force is not applied to the light source unit. Consequently, a position of the light source with respect to the housing can be prevented from deviating.

In addition, in the invention, the heat radiation member has thermal conductivity and is flexible.

In accordance with the invention, since the heat radiation member has thermal conductivity and is flexible, a heat radiation property can be improved, and the heat radiation member can be deformed moderately and fixed to the housing such that an undesirable external force is not applied to the light source unit.

In addition, the invention provides a position adjustment method for adjusting a position of a light source unit of an optical pickup apparatus which includes a housing and the light source unit fixed to the housing and records or reproduces information by irradiating a recording medium with light from the light source unit, the position adjustment method comprising the steps of:

providing a jig having a chuck portion provided to keep a fixed positional relation with respect to the housing, for detachably holding the light source unit, the chuck portion being provided so as to be displaceable over an advanced position where the chuck portion is capable of holding the light source unit, which is arranged in a predetermined provisional position with respect to the housing, and a retracted position where the chuck portion is retracted in a direction in which the chuck portion is away from the housing along a predetermined reference axis, with respect to the advanced position;

displacing and retracting the light source unit which is in the provisional position in a direction being away from the housing by arranging the chuck portion in the retracted position using the jig; and sliding and displacing the light source unit in a direction crossing the reference axis with respect to the housing and angularly displacing the light source unit around the reference axis and an axis crossing the reference axis, in a state in which the chuck portion is in the retracted position.

In accordance with the invention, the chuck portion of the jig is provided to keep a fixed positional relation with respect to the housing and detachably holds the light source unit, and is provided so as to be displaceable over the advanced position where the chuck portion is capable of holding the light source unit, which is arranged in the predetermined provisional position with respect to the housing, and the retracted position where the chuck portion is retracted in a direction in which the chuck portion is away from the housing along the predetermined reference axis, with respect to the advanced position. Using this jig, the light source unit which is in the provisional position is displaced in the direction being away from the housing and is arranged in the position retracted from the housing by arranging the chuck portion in the retracted position.

In a state in which the chuck portion is in the retracted position, the light source unit is slid and displaced in a direction crossing the reference axis with respect to the housing and angularly displaced around the reference axis and the axis crossing the reference axis. A positional relation between the chuck portion holding the light source unit and the housing is adjusted in this way, whereby a positional relation between the light source unit and the housing can be adjusted without adjusting a positional relation between the chuck portion and the jig or a positional relation between the chuck portion and the light source unit. Consequently, adjustment work for a position of an optical axis of light form the light source unit can be facilitated.

In addition, in the invention, the retracted position is in a recording and reproducing position which is set with respect to the housing in advance, and a distance between the recording medium and the light source unit is a distance at the time when recording or reproduction of information is performed.

In accordance with the invention, the retracted position is in the recording and reproducing position which is set with respect to the housing in advance, and a distance between the recording medium and the light source unit is set so as to be the distance at the time when recording or reproduction of information is performed. Consequently, in addition to the position adjustment of an optical axis, a spot shape of light irradiated on the recording medium can be adjusted such that light from the light source is narrowed down on the recording medium.

In addition, in the invention, the position adjustment method further comprises a step of fixing the light source unit which is held by the chuck portion in the retracted position, to the housing using a fixing material.

In accordance with the invention, the light source unit, which is held by the chuck portion in the retracted position, is fixed to the housing using the fixing material according to fixing means. Consequently, the light source can be fixed to the housing in a state in which a position of the optical axis is adjusted, and an optical pickup apparatus with high convenience can be realized.

In addition, in the invention, the position adjustment method further comprises a step of resiliently pressing the light source unit toward the housing using pressing means for resiliently pressing the light source unit toward the housing, arranging the light source unit in the provisional position, and gripping the light source unit arranged in the provisional position using the chuck portion.

In accordance with the invention, the light source unit is resiliently pressed toward the housing using the pressing means for resiliently pressing the light source unit toward the housing and is arranged in the provisional position. The light source unit arranged in the provisional position is gripped using the chuck portion. In arranging the light source unit in the provisional position in this way, since the light source unit is resiliently pressed and displaced by the pressing means, the light source unit is prevented from being undesirably pressed, and damage to and deformation of the light source unit can be prevented. Moreover, in a state in which positional deviation of the light source unit which is in the provisional position is prevented by the pressing means, the light source unit can be gripped by the chuck portion.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
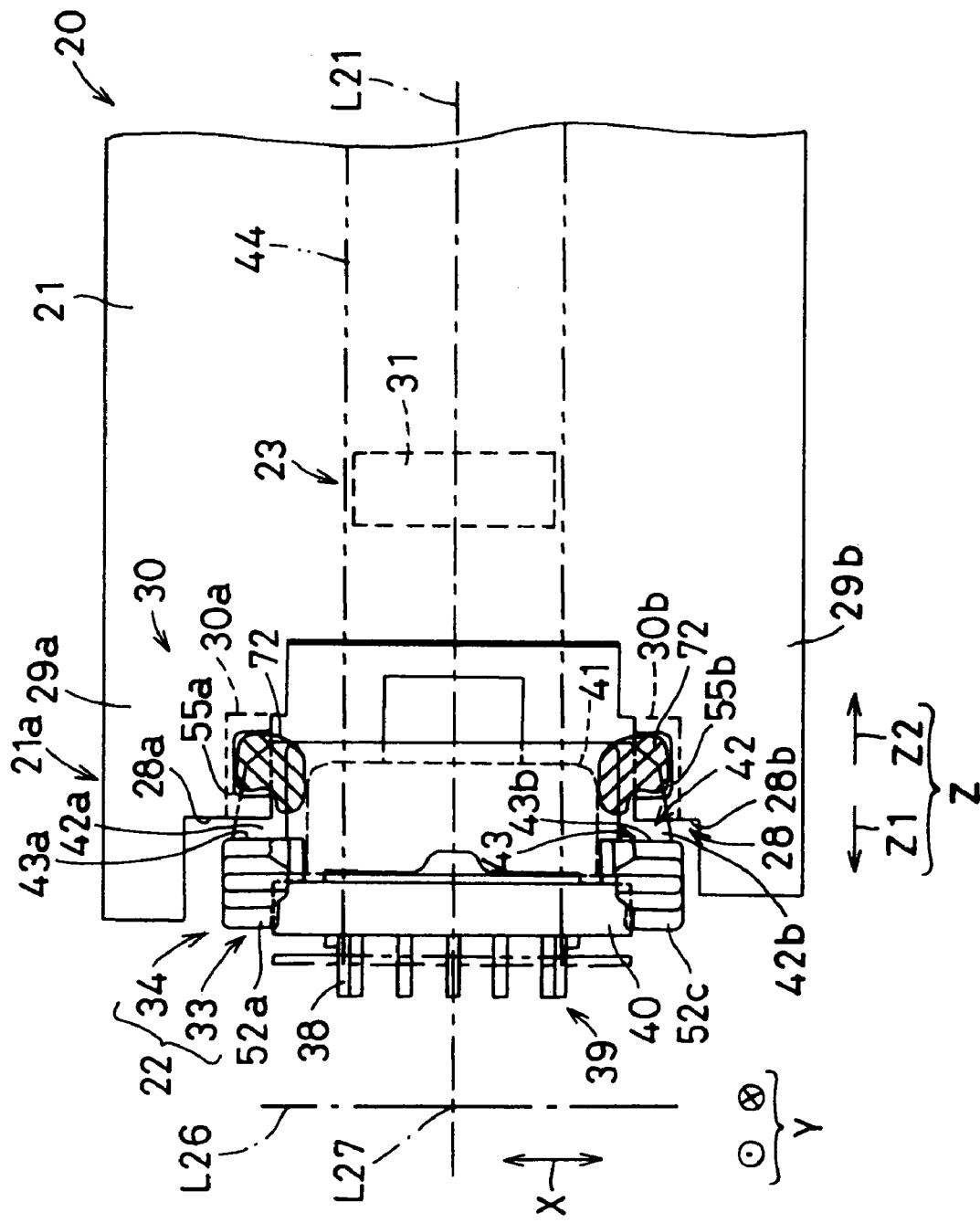
FIG. 1 is a front view showing a part of an optical pickup apparatus according to an embodiment of the invention.

Now referring to the drawings, preferred embodiments of the invention are described below.

Figure 2:
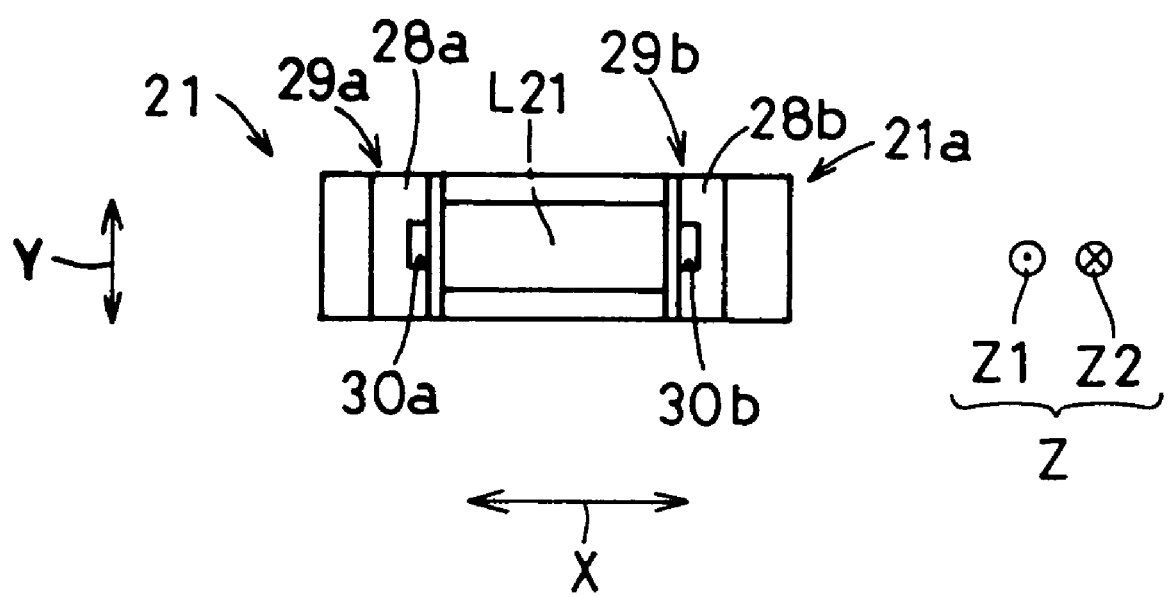
FIG. 2 is a plan view showing one side portion of a housing.

FIG. 1 is a front view showing a part of an optical pickup apparatus 20 according to an embodiment of the invention. FIG. 2 is a plan view showing one side portion 21a of a housing 21. The optical pickup apparatus 20 is an apparatus for recording or reproducing information by irradiating a recording medium (not shown) such as a Compact Disk (CD) with light. The optical pickup apparatus 20 includes a housing 21 and a light source unit 22. An operator adjusts a position of the light source unit 22 with respect to the housing 21 in accordance with a work procedure based upon a position adjustment method for the light source unit 22 of the invention using a position adjustment apparatus 60 for the light source unit 22 of the invention.

The light source unit 22 is provided in one side portion 21a of the housing 21. The one side portion 21a of the housing 21 is formed in a recessed shape piercing through in a thickness direction and opening in a withdrawing direction Z1. The withdrawing direction Z1 is a direction in which, of a first axial direction Z parallel with a predetermined reference axis L21 of the housing 21, the light source unit 22 is away from the one side portion 21a of the housing 21.

In relation to the first axial direction Z, a direction crossing the reference axis L21 and perpendicular to the thickness direction of the housing 21, is assumed to be a second axial direction X, and a direction crossing the reference axis L21 and perpendicular to the second axial direction X is assumed to be a third axial direction Y. Of axes crossing the reference axis L21, an axis perpendicular to the reference axis L21 and parallel with the second axial direction X is assumed to be a second axis L26, and an axis perpendicular to the reference axis L21 and the second axis L26 is assumed to be a third axis L27. The third axis L27 is also an axis parallel with the third axial direction Y.

One or more, more specifically, two reference planes 28a and 28b, which are along one imaginary plane perpendicular to the reference axis L21, are formed in the one side portion 21a of the housing 21. In the following description, when at least one of the two reference planes 28a and 28b is indicated, it may be represented as "reference plane 28".

Guide grooves 30a and 30b are formed in side parts 29a and 29b opposed to each other of the one side portion 21a of the housing 21. The respective guide grooves 30a and 30b are cavities of the respective side parts 29a and 29b and extend along the reference axis L21. The respective guide grooves 30a and 30b open in directions opposed to each other. In the following description, when at least one of the two guide grooves 30a and 30b is indicated, it may be represented as "guide groove 30".

The guide groove 30 is arranged so as to extend from the reference plane 28 to an approaching direction Z2. The approaching direction Z2 is a direction opposite to the withdrawing direction Z1 of the first axial direction Z. The light source unit 22 which emits light is arranged in a position between the side parts 29a and 29b of the one side portion 21a of the hosing 21 and is fixed to the housing 21 in this position.

The optical pickup apparatus 20 is constituted by further including light guiding means 23 and driving means (not shown). The light guiding means 23 and the driving means are held in the housing 21. The light guiding means 23 is means for guiding light from the light source unit 22 to a recording medium. The light guiding means 23 is constituted by including a collimator lens 31 for changing the light from the light source unit 22 to parallel rays and emitting the parallel rays, and an objective lens (not shown) for condensing the light from the light source unit 22 guided via the collimator lens 31.

The collimator lens 31 is arranged in a position opposed to the light source unit 22. The collimator lens 31 is arranged such that an axis thereof is parallel with the reference axis L21 of the housing 21. The light from the light source unit 22 is guided to the collimator lens 31. The light guiding means 23 may include various optical lenses such as an erecting mirror and a ¼ wavelength plate in addition to the collimator lens 31 and the objective lens.

The light from the light source unit 22 is guided to the objective lens via the collimator lens 31 and condensed on the recording surface for recording information on the recording medium by this objective lens. The objective lens is held by the driving means and driven to be displaced with respect to the recording medium by the driving means so as to condense the light in a desired position of the recording medium. Reflected light from the recording medium is guided to a light receiving portion 37 (see FIG. 3) via the objective lens and the collimator lens 31.

Figure 3:
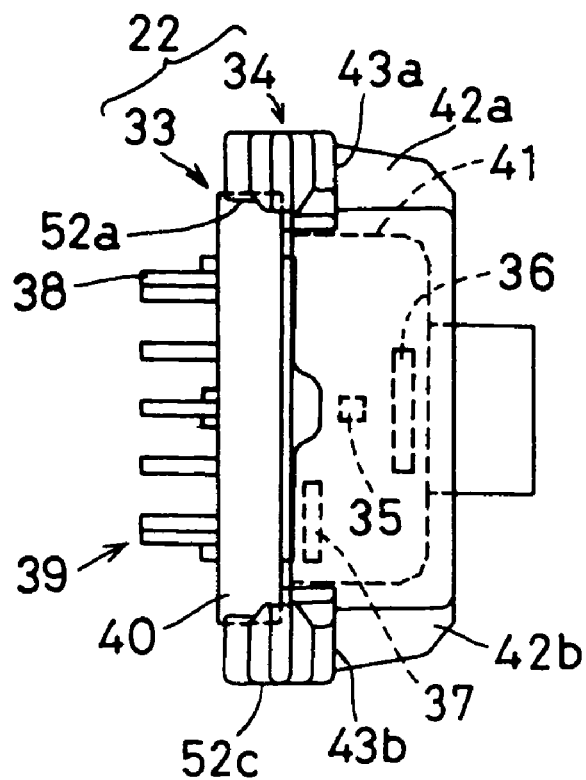
FIG. 3 is a front view showing a light source unit.
Figure 4:
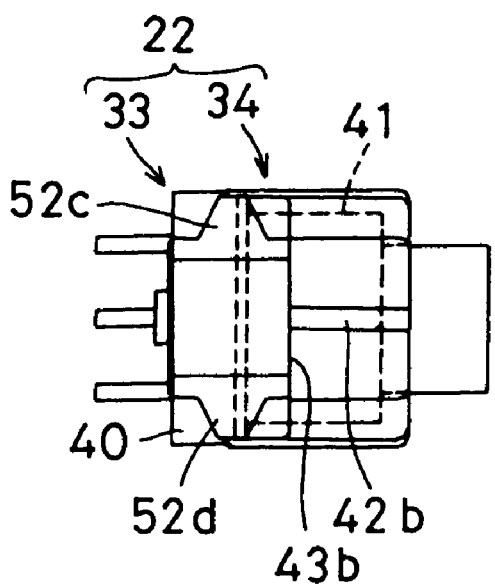
FIG. 4 is a bottom view showing the light source unit of FIG. 3.
Figure 5:
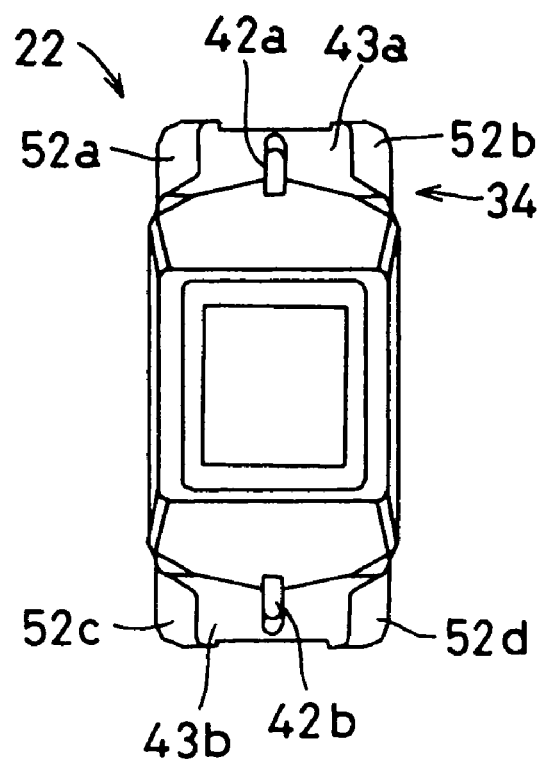
FIG. 5 is a right side view showing the light source unit of FIG. 3.
Figure 6:
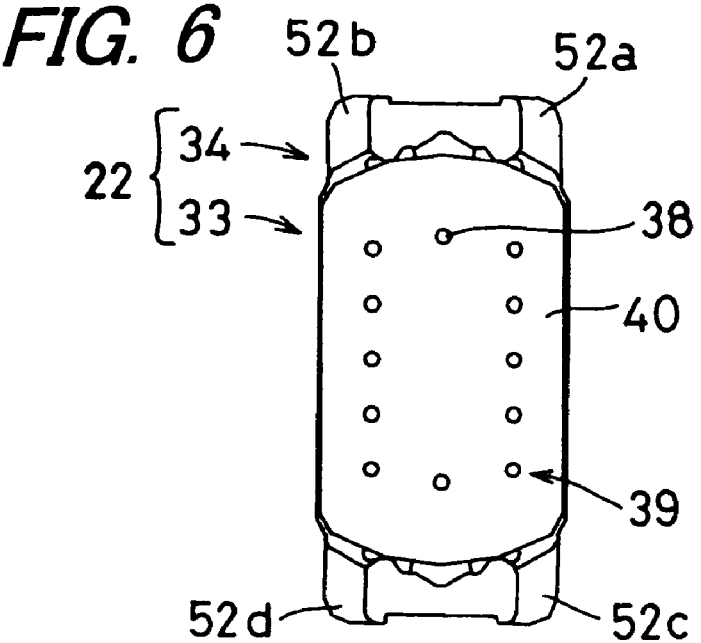
FIG. 6 is a left side view showing the light source unit of FIG. 3.

FIG. 3 is a front view showing the light source unit 22. FIG. 4 is a bottom view showing the light source unit 22 of FIG. 3. FIG. 5 is a right side view showing the light source unit 22 of FIG. 3. FIG. 6 is a left side view showing the light source unit 22 of FIG. 3. The light source unit 22 includes a light source 33 and a holder 34 for holding the light source 33. The light source 33 is constituted by including a light emitting portion 35, a hologram 36, and the light receiving portion 37.

The light emitting portion 35 is realized by, for example, a semiconductor laser and emits a laser beam to the collimator lens 31. The hologram 36 diffracts to divide the reflected light from the recording medium for every plurality of areas and guides the divided light to the light receiving portion 37. The light receiving portion 37 is realized by, for example, a photodiode and receives the laser beam from the hologram 36. On the basis of a result of the light receipt by the light receiving portion 37, the light pickup apparatus 20 can record or reproduce information with respect to the recording medium.

In addition, the light source 33 includes a terminal group 39 including various terminals such as a ground terminal 38 which protrudes toward a side opposite to the housing 21. The terminal group 39 is provided in a stem 40 to be described later. The light source 33 is also called a hologram laser unit and is constituted by integrating the light emitting portion 35, the hologram 36, and the light receiving portion 37. The light emitting portion 35, the hologram 36, and the light receiving portion 37 are mounted to the stem 40 serving as a base, and a cap 41 is provided so as to cover these components from the outside.

The holder 34 is provided so as to cover the cap 41 from the outside. The holder 34 is fixed by, for example, adhesion or fitting with the stem 40 of the light source 33. A laser beam from the light source 33 is guided to the collimator lens 31 which is in the outside thereof via the holder 34.

Figure 7:
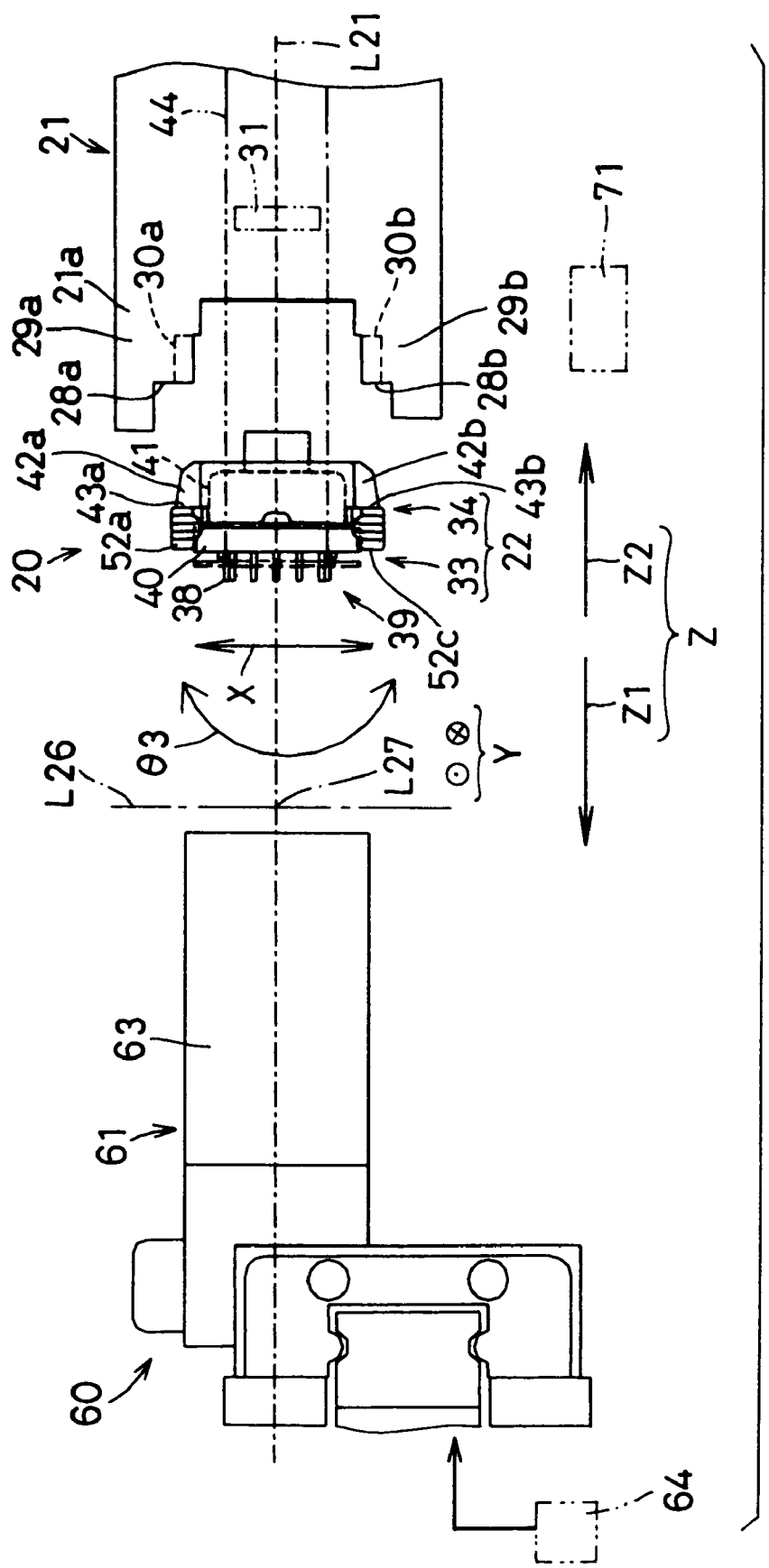
FIG. 7 is a front view showing the optical pickup apparatus before the light source unit is fixed to the housing.
Figure 8:
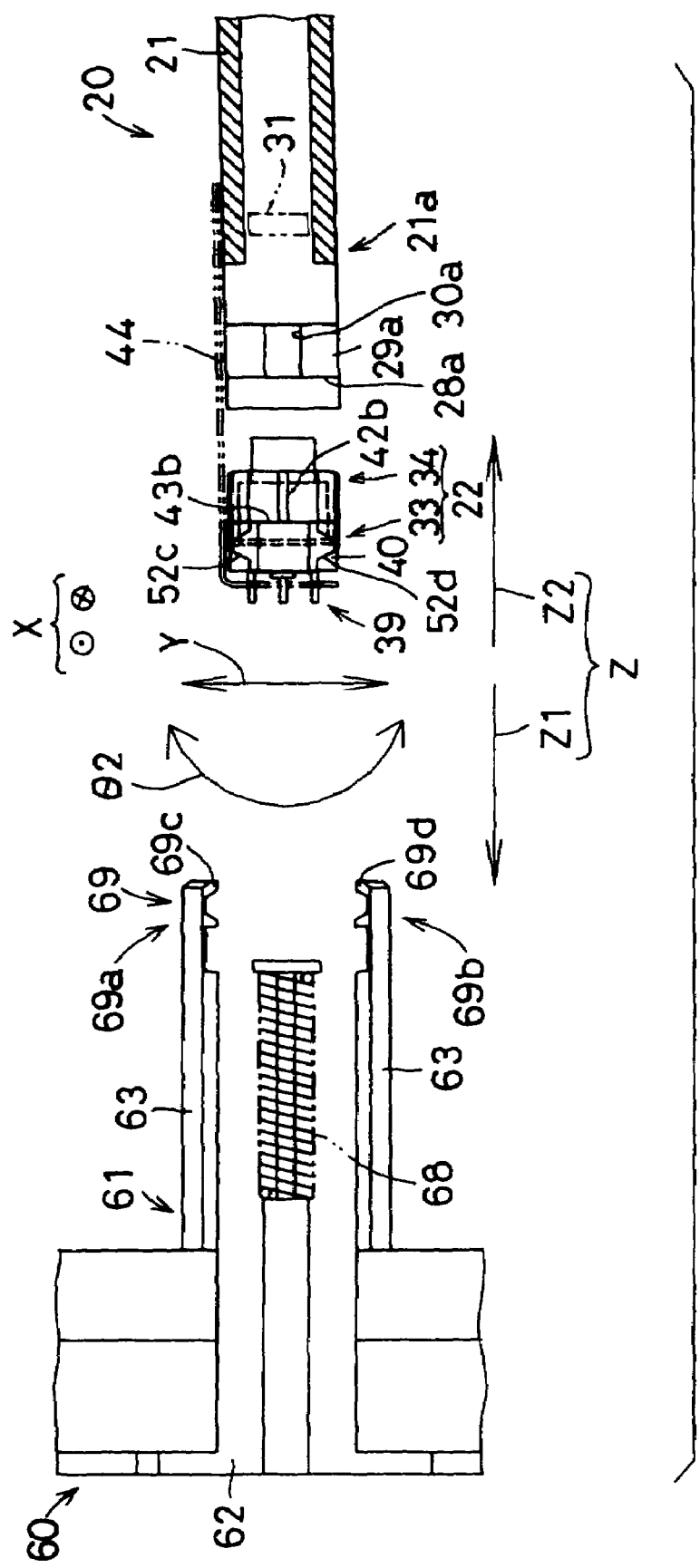
FIG. 8 is a sectional view showing the optical pickup apparatus before the light source unit is fixed to the housing.
Figure 9:
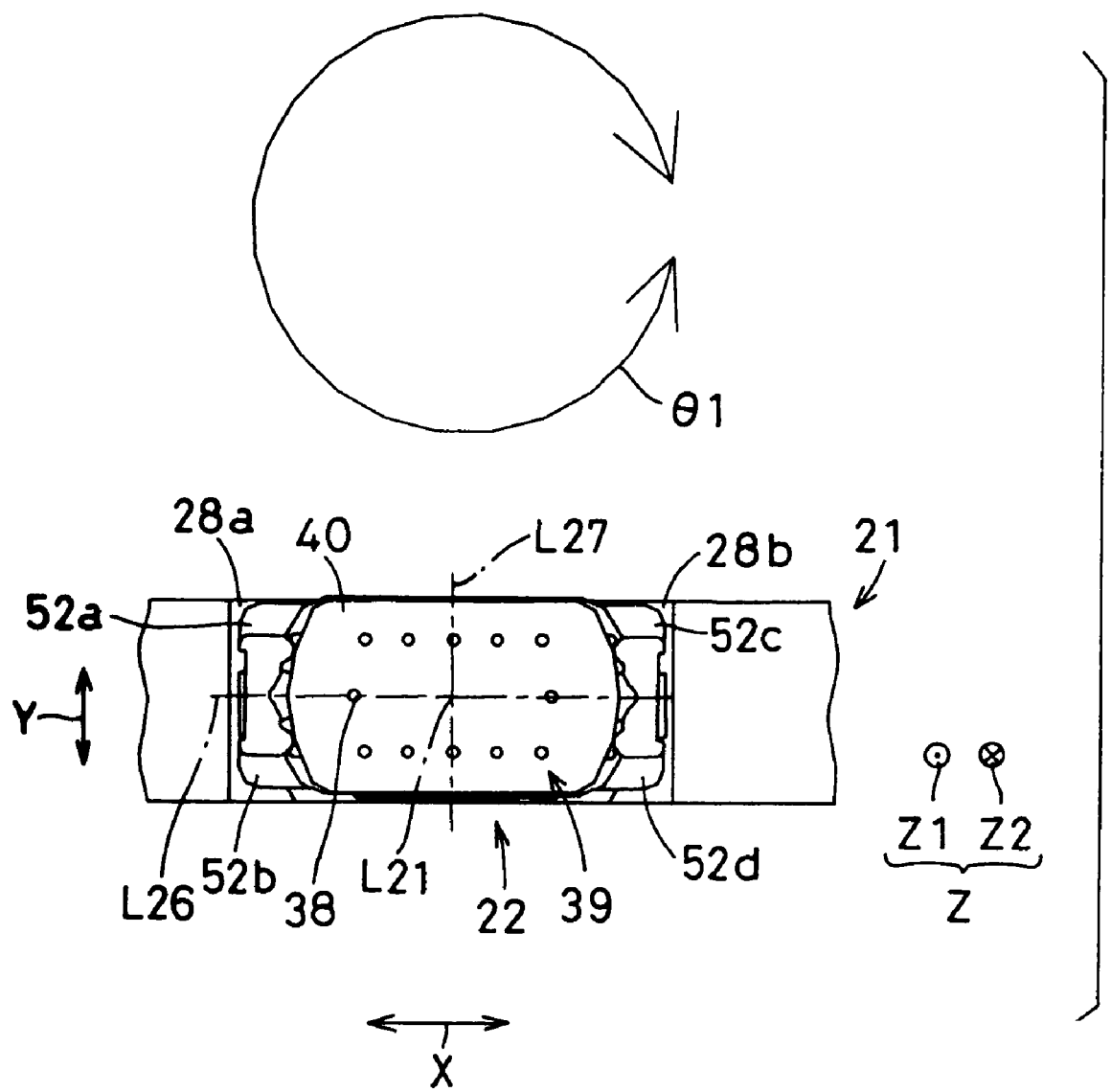
FIG. 9 is a plan view showing the light source unit which is provided in the one side portion of the housing.

FIG. 7 is a front view showing the optical pickup apparatus 20 before the light source unit 22 is fixed to the housing 21. FIG. 8 is a sectional view showing the optical pickup apparatus 20 before the light source unit 22 is fixed to the housing 21. FIG. 9 is a plan view showing the light source unit 22 provided in the one side portion 21a of the housing 21. In adjusting a position of the light source unit 22 with respect to the housing 21, the light source unit 22 is held in the housing 21. As shown in FIGS. 3 to 6, one or more (two in the embodiment) guide pieces 42a and 42b are formed in the light source unit 22. The respective guide pieces 42a and 42b are locked by the corresponding respective guide grooves 30a and 30b of the housing 21. In the embodiment, the respective guide pieces 42a and 42b are formed in the holder 34. In the following description, when at least one of the guide pieces 42a and 42b is indicated, it may be represented as "guide piece 42".

The respective guide pieces 42a and 42b serving provisional position adjustment means protrude from the holder 34 along the second axial direction X and are arranged in a position across the holder 34 with respect to the second axial direction X. Moreover, the guide piece 42 is arranged so as to extend in the first axial direction Z. By inserting the guide piece 42 through the guide groove 30 of the housing to lock the same, the light source unit 22 can be held in the housing 21 before chucking the light source unit 22 using a jig 61 to be described later.

Figure 10:
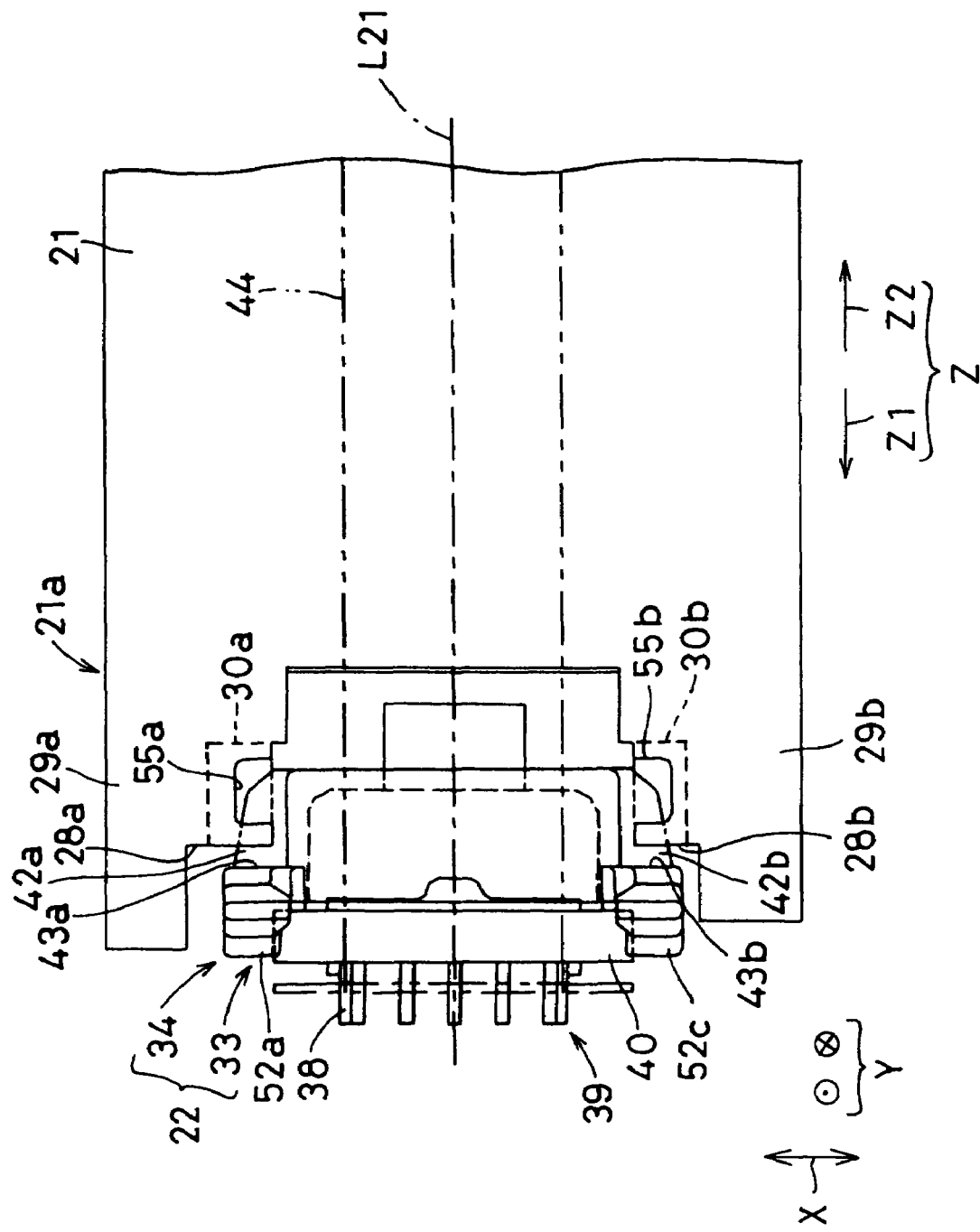
FIG. 10 is a front view showing the light source unit held in the housing.

FIG. 10 is a front view showing the light source unit 22 held in the housing 21. Referring to FIGS. 3 to 5, one or more (two in the embodiment) opposed surfaces 43a and 43b facing the one side portion 21a of the housing 21 are formed in the light source unit 22. In the embodiment, the two opposed surfaces 43a and 43b are formed in the holder 34. The respective opposed surfaces 43a and 43b of the holder 34 are formed in a plane perpendicular to a direction in which the guide piece 42 extends. The respective opposed surfaces 43a and 43b of the holder 34 are opposed to the reference plane 28 of the housing 21 in a state in which the guide piece 42 of the light source unit 22 is locked in the guide groove 30 of the housing 21. In the following description, when at least one of the two opposed surfaces 43a and 43b is indicated, it may be represented as "opposed surface 43".

The light source unit 22 is held by a flexible printed circuit board (abbreviated as FPC) 44 and the housing 21 in a state in which the light source unit 22 is chucked and gripped by the jig 61. The FPC 4 is formed in a substantially L shape, electrically and mechanically connected to the respective terminals of the terminal group 39 of the light source unit 22 at one end thereof, and held in the housing 21 at the other end thereof.

The guide piece 42 of the light source unit 22 protrudes along the second axial direction X and is arranged so as to extend in the first axial direction Z. In this shape, in soldering the light source unit 22 to the FPC 44, the housing 21 is arranged such that the reference axis L21 is parallel to a vertical direction, and the light source unit 22 is set in the housing 21. Then, soldering work can be facilitated compared with a case in which the housing 21 is arranged such that the reference axis L21 is parallel to a horizontal direction.

Figure 11:
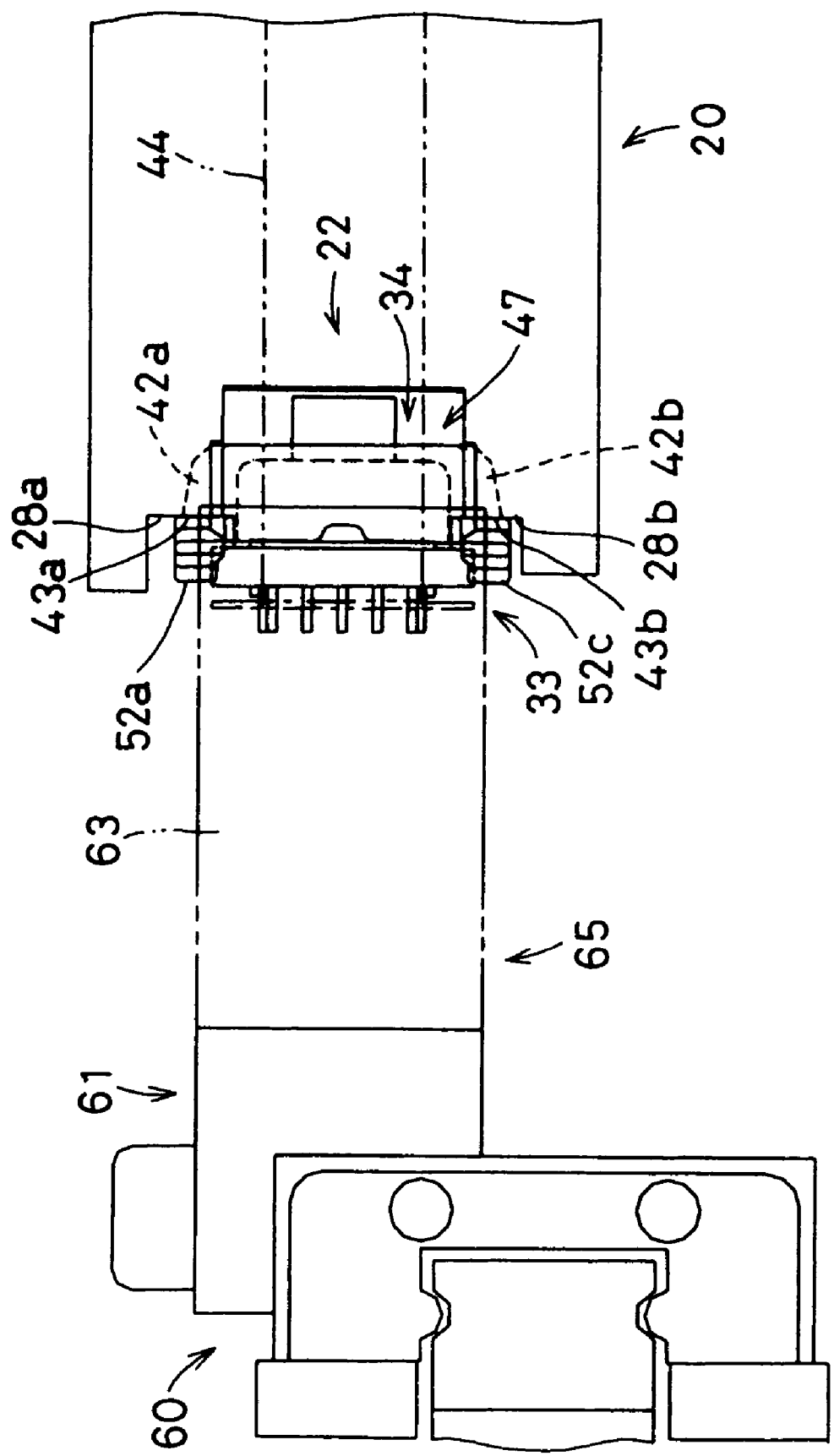
FIG. 11 is a plan view showing the light source unit arranged in a provisional position.
Figure 12:
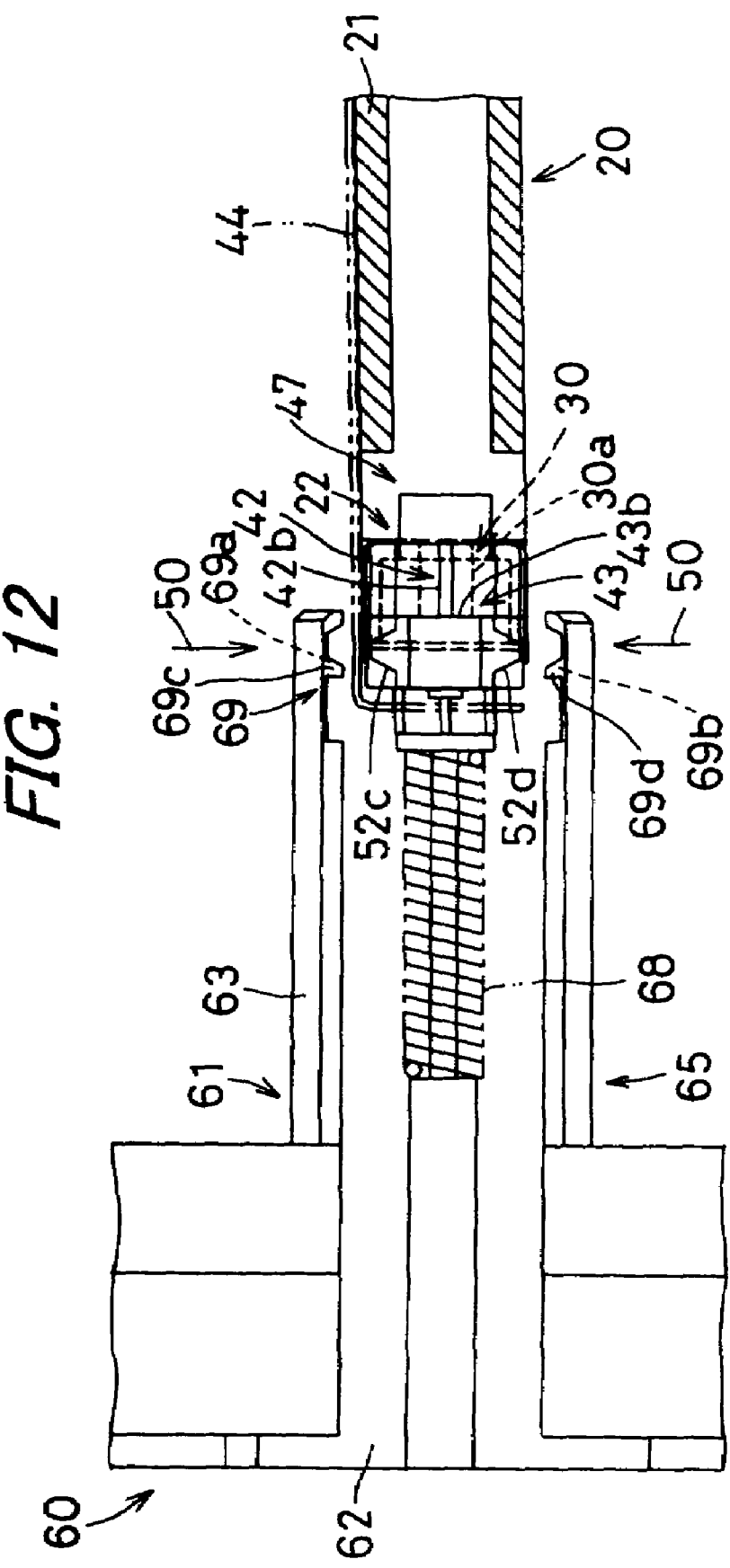
FIG. 12 is a sectional view showing the light source unit arranged in the provisional position.
Figure 13:
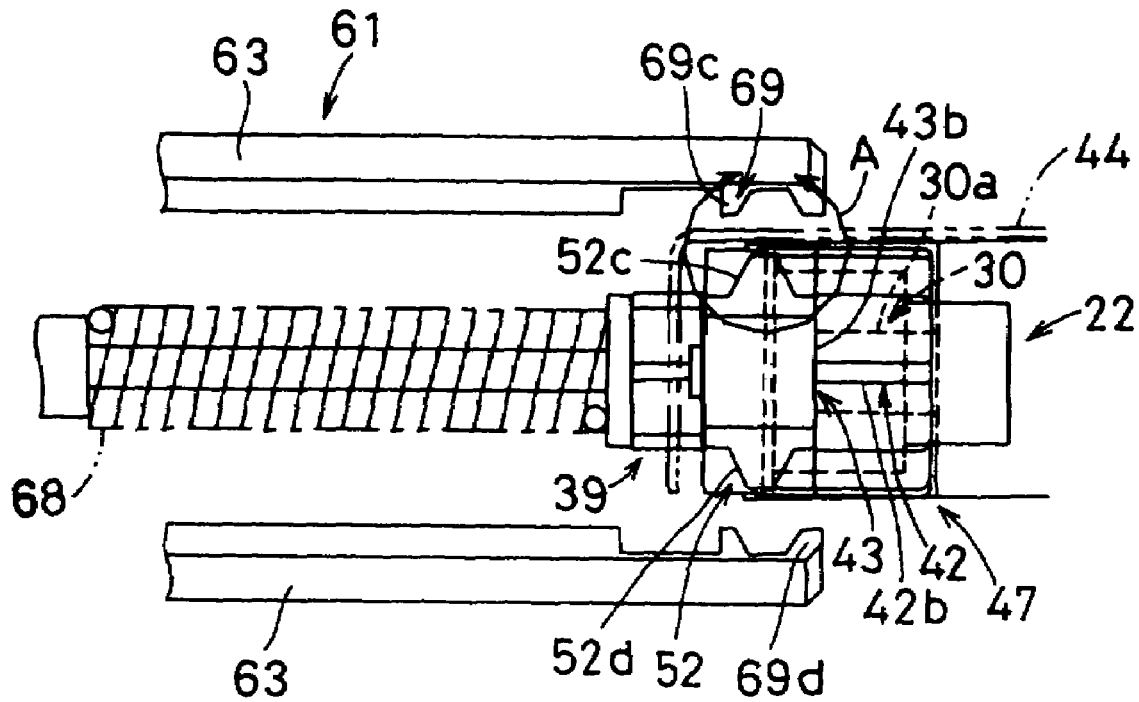
FIG. 13 is a plan view showing the light source unit which is in the provisional position.
Figure 14:
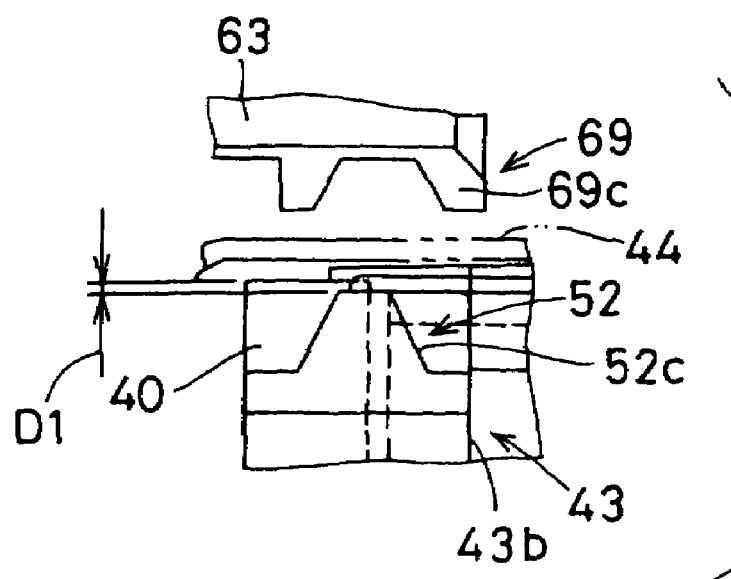
FIG. 14 is a plan view showing a section A in FIG. 13.

FIG. 11 is a plan view showing the light source unit 22 arranged in a provisional position 47. FIG. 12 is a sectional view showing the light source unit 22 arranged in a provisional position 47. FIG. 13 is a plan view showing the light source unit 22 which is in the provisional position 47. FIG. 14 is a plan view showing a section A in FIG. 13. A position of the light source unit 22, which is held in the housing 21 by the guide piece 42 and the FPC 44, is adjusted with respect to the housing 21 by using the position adjustment apparatus 60, and the light source unit 22 is fixed to the housing 21. The position adjustment apparatus 60 is arranged on the side opposite to the housing 21 with respect to the light source unit 22.

The position adjustment apparatus 60 includes the jig 61 for holding the light source unit 22 so as to be detachable and displaceable. As to the jig 61, a base portion 62 thereof is coupled to and held by a predetermined base (not shown). Moreover, the housing 21 is coupled to and held by the base. In this way, the jig 61 and the housing 21 are held by the base in a state in which the jig 61 and the housing 21 keep a fixed positional relation with each other by being coupled to the base. Consequently, the jig 61 is displaced with respect to the housing 21, whereby a position of the light source unit 22 with respect to the housing 21 can be adjusted.

The jig 61 includes a chuck portion 63 provided to keep a fixed positional relation with respect to the housing 21. The chuck portion 63 is provided so as to be displaceable over an advanced position 65 and a retracted position 66. The advanced position 65 is a position where the chuck portion 63 is capable of holding the light source unit 22 which is arranged in the predetermined provisional position 47 with respect to the housing 21. In addition, the retracted position 66 is a position where the chuck portion 63 is retracted in the withdrawing direction Z1, which is a direction in which the chuck portion 63 is away from the housing 21 along the reference axis L21, with respect to the advanced position 65. In this retracted position 66, a position of the light source unit 22 with respect to the housing 21 is adjusted by position adjustment including in-plane adjustment and tilt adjustment.

In a state in which the light source unit 22 is held by the FPC 44 and the housing 21 as described above, an optical axis of a laser beam from the light source unit 22 is not always arranged so as to be along a desired optical axis to be parallel with the reference axis L21. This is because, in order to perform the tilt adjustment, the light source unit 22 is required to be held with a certain degree of freedom with respect to the housing 21 and cannot be fixed by an elastic body such as a leaf spring.

The light source unit 22 is arranged in the provisional position 47 using the position adjustment apparatus 60 in a state in which the light source unit 22 is held by the FPC 44 and the housing 21. The position adjustment apparatus 60 further includes pressing means 68. In order to arrange the light source unit 22 in the provisional position 47, the pressing means 68 resiliently presses the light source unit 22 toward the housing 21. The pressing means 68 is realized by, for example, an elastic body such as a spring member.

In a state in which the light source unit 22 is held by the FPC 44 and the housing 21, the chuck portion 63 of the jig 61 is spaced apart from the holder 34 of the light source unit 22. In this state, the pressing means 68 is brought into abutment against the light source unit 22, more specifically, the terminal group 39 from the side opposite to the housing 21 to resiliently press and displace the light source unit 22 in the approaching direction Z2. Thereafter, the opposed surface 43 facing the hosing 21 of the holder 34 is brought into abutment against the reference plane 28 of the housing 21 surely without a gap. The approaching direction Z2 is a direction in which the light source unit 22 is proximate to the housing 21, of the first axial direction Z.

The pressing means 68 resiliently presses the light source unit 22 such that an excessive load is not applied to the light source 33 and the holder 34 when the opposed surface 43 and the reference plane 28 are brought into abutment against each other. A pressing force generated by the pressing means 68 is set to a degree at which the opposed surface 43 does not separate from the reference plane 28 and to a degree at which the terminal group 39 of the light source 33 is not deformed.

The chuck portion 63 of the jig 61 is a pair of holding means opposed to each other and is arranged on both sides in the third axial direction Y with respect to the light source unit 22 which is in the provisional position 47 in a state in which the chuck portion 63 is arranged in the advanced position 65. Moreover, the chuck portion 63 nips the light source unit 22 which is in the provisional position 47 from both sides in the third axial direction Y, as indicated by arrow 50 in FIG. 12, in a state in which the chuck portion 63 is arranged in the advanced position 65. In addition, one or more (four in the embodiment) chuck fitting portions 69a to 69d in which the light source unit 22 fits are formed in the chuck portion 63. In the following description, when at least one of the four chuck fitting portions 69a to 69d is indicated, it may be represented as "chuck fitting portion 69".

One or more (four in the embodiment) light source fitting portions 52a to 52d which fit in the chuck portion 63, are formed in the light source unit 22. The respective light source fitting portions 52a to 52d serving as adjustment positioning means are provided in association with the respective chuck fitting portions 69a to 69d of the chuck portion 63. In the embodiment, the four light source fitting portions 52a to 52d are formed in the holder 34. The respective light source fitting portions 52a to 52d are formed in a substantially triangle shape protruding in a tapered shape.

The light source fitting portions 52a to 52d and the chuck fitting portions 69a to 69d are arranged in positions where the FPC 44 is not interposed among them, with respect to the third axial direction Y. Although the light source fitting portions 52a to 52d and the chuck fitting portions 69a to 69d are arranged on both sides in the third axial direction Y with respect to the holder 34, these portions may be arranged only on one side or another side in the third axial direction Y. In the following description, when at least one of the four light source fitting portions 52a to 52d are indicated, it may be represented as "light source fitting portion 52".

The chuck fitting portion 69 is formed in a substantially V shape. The opposed light source fitting portion 52 fits in the chuck fitting portion 69 in a state in which the light source unit 22 is in the provisional position 47. Since the chuck fitting portion 69 is formed in a substantially V shape, and the light source fitting portion 52 is formed in a substantially triangle shape, when the light source unit 22 is chucked by the chuck portion 63, the light source fitting portion 52 can be easily guided to the chuck fitting portion 69 to prevent chucking deviation and grasp the light source unit 22 surely. In addition, when the chuck portion 63 is displaced, the light source unit 22 and the chuck portion 63 can be displaced integrally. Consequently, the chuck portion 63 can be displaced with respect to the housing 21 to arrange the light source unit 22 in a desired position with respect to the housing 21 surely.

In addition, the light source fitting portion 52 is arranged in an area formed by projecting the housing 21 on the reference axis L21. In other words, the light source fitting portion 52 is arranged in an area to be nipped between the respective surface portions on both sides in the third axial direction Y of the housing 21. Moreover, the light source fitting portion 52 is formed so as to be lower than the stem 40 of the light source 33 by a step height D1 with respect to the third axial direction Y and is arranged so as not to protrude from the stem 40 of the light source 33.

Since the light source fitting portion 52 is constituted as described above, the light source fitting portion 52 is arranged in a position where the light source fitting portion 52 does not protrude in the third axial direction Y from the pickup main body, that is, the housing 21 when the tilt adjustment is performed. Therefore, the light source fitting portion 52 is arranged so as not to be a hindrance, or a thickness of the pickup main body is controlled to be equal to or less than a predetermined value, whereby the optical pickup apparatus 20 with high convenience can be realized.

Figure 15:
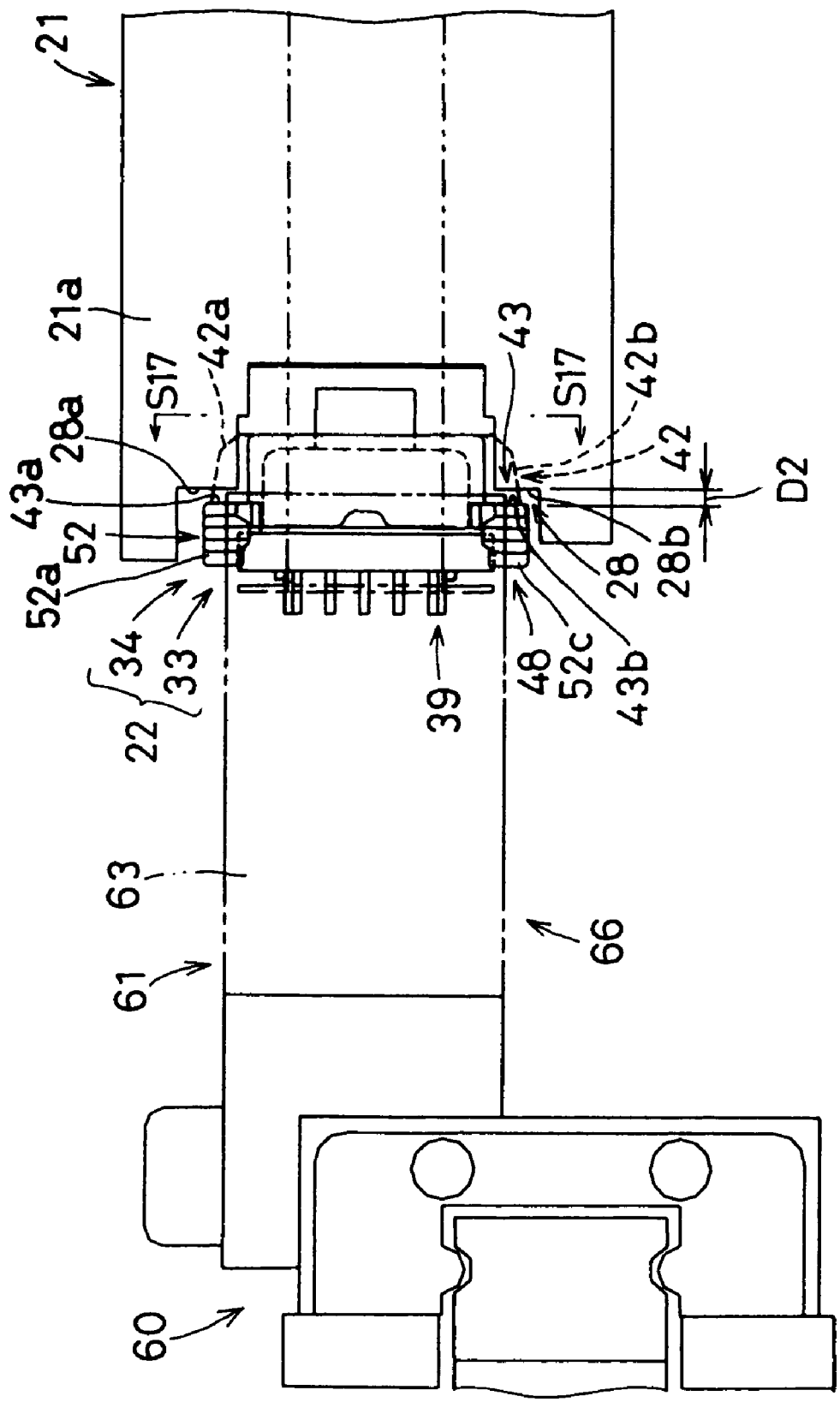
FIG. 15 is a plan view showing a position adjustment apparatus at the time when a chuck portion is arranged in a retracted position.
Figure 16:
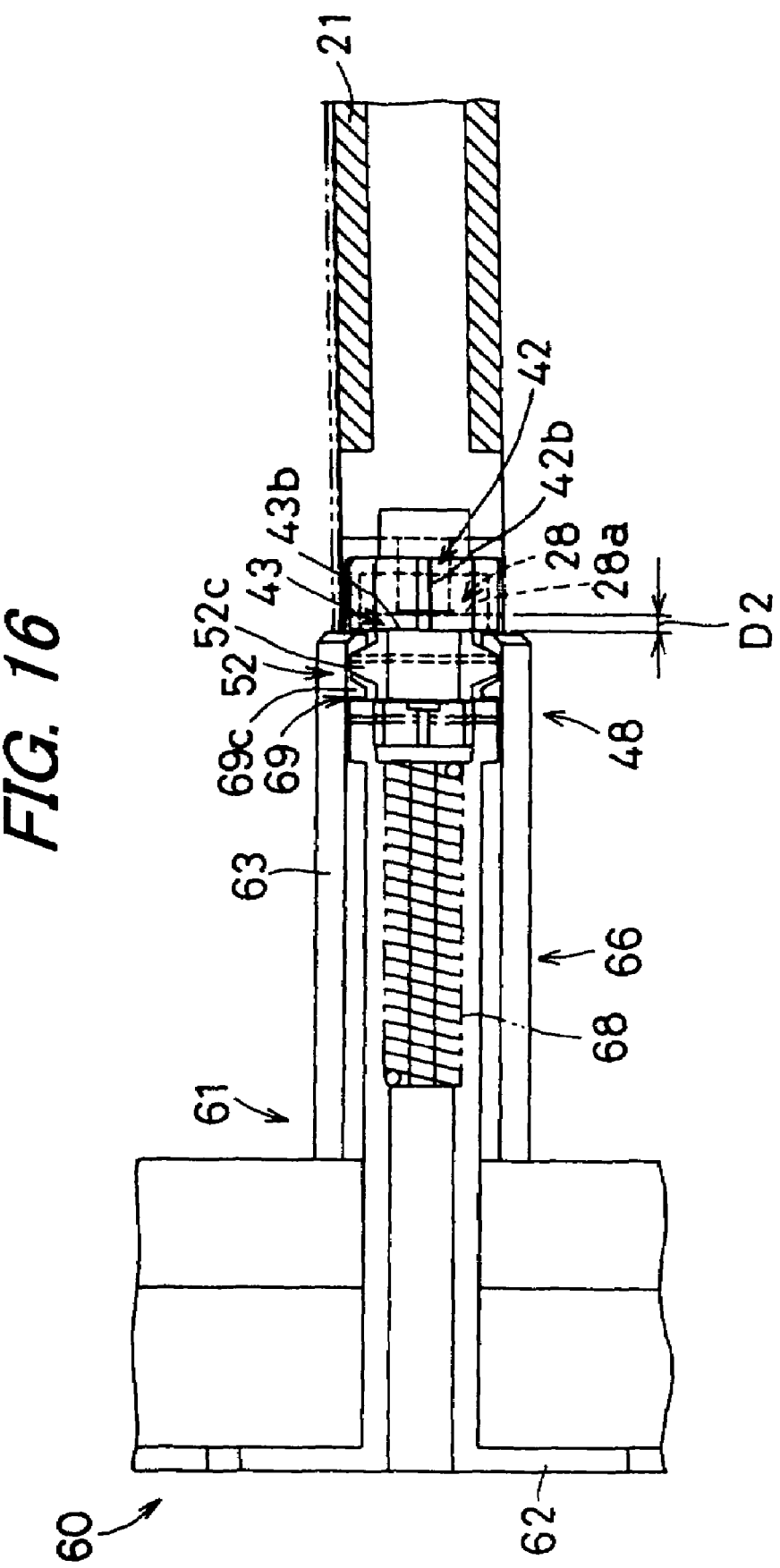
FIG. 16 is a sectional view showing the position adjustment apparatus at the time when a chuck portion is arranged in a retracted position.

FIG. 15 is a plan view showing the position adjustment apparatus 60 at the time when the chuck portion 63 is arranged in the retracted position 66. FIG. 16 is a sectional view showing the position adjustment apparatus 60 at the time when the chuck portion 63 is arranged in the retracted position 66. When the light source unit 22 is arranged in the provisional position 47 by the pressing means 68, and the opposed surface 43 and the reference plane 28 are brought into contact with and abutment against each other, the light source unit 22 is arranged such that the opposed surface 43 thereof is perpendicular to the reference axis L21. While keeping this state, the light source unit 22 is nipped surely from both sides of the third axial direction Y by the chuck fitting portion 69.

The position adjustment apparatus 60 mechanically displaces the chuck portion 63 in a state of nipping the holder 34 toward the withdrawing direction Z2 to be arranged from the advanced position 65 to the retracted position 66 and allows the opposed surface 43 to be away from the reference plane 28. The retracted position 66 is in a recording/reproduction position 48, which is set with respect to the housing 21 in advance, and a distance between the recording medium and the light source unit 22 is a distance at the time when information is recorded or reproduced. The chuck portion 63 arranges the light source unit 22 in a position retracted from the housing 21 in a state in which the chuck portion 63 is in the retracted position 66. Consequently, the light source unit 22 is held in the recording/reproduction position 48 which is apart from the housing 21 by a predetermined retraction distance D2.

The retraction distance D2 is assumed to be a distance at which clearance of a degree allowing the tilt adjustment of an optical axis to be performed and a distance in terms of design from the reference plane 28 to a light-emitting point which is a center position of the light emitting portion 35. More specifically, the retraction distance D2 is a distance at which the tilt adjustment is possible and is a distance at which the light source unit 22 moves apart from the housing 21 in the withdrawing direction Z1 until the light source unit 22 is in an optimal position where a spot shape of a laser beam condensed on the recording medium in order to record or reproduce information. In this way, the recording/reproduction position 48 apart from the reference plane 28 by the retraction distance D2 is a position for displacing the light source unit 22 with respect to the housing 21 to perform position adjustment of an optical axis.

The chuck portion 63 which is in the retracted position 66 is slid and displaced in the second and the third axial directions X and Y with respect to the housing 21 in a state in which the light source unit 22 is held and is angularly displaced about the reference axis L21, the second axis L26, and the third axis L27. When the chuck portion 63 is displaced in at least one direction among the second and the third axial directions X and Y and a first angular displacement direction θ1 about the reference axis L21, the light source unit 22 is displaced in the one direction in the same manner. In this way, the light source unit 22 is displaced in at least one of the second and the third axial directions X and Y and the first angular displacement direction θ1 about the reference axis, whereby the in-plane adjustment with which a position of the light source unit 22 with respect to the housing 21 is adjusted, is performed.

In addition, when the chuck portion 63 is angularly displaced in at least one of a second angular displacement direction θ2 about the second axis L26 and a third angular displacement direction θ3 about the third axis L27, the light source unit 22 is angularly displaced in the one direction in the same manner. Consequently, the light source unit 22 is angularly displaced in at least one of the second angular displacement direction θ2 and the third angular displacement direction θ3, whereby the tilt adjustment with which a tile with respect to the reference axis L21 of an optical axis is adjusted, is performed.

The position adjustment apparatus 60 includes adjustment driving means 64 (see FIG. 7) for driving to displace the chuck portion 63 and the pressing means 68. The adjustment driving means 64 slides and displaces the chuck portion 63 in the first to the third axial directions Z, X and Y with respect to the housing 21, and angularly displaces the chuck portion 63 about the reference axis L21 as well as the second and the third axes L26 and L27. In addition, the adjustment driving means 64 slides and displaces the pressing means 68 in the first axial direction Z with respect to the housing 21. The displacement drive by the adjustment driving means 64 is controlled by control means (not-shown).

Figure 17:
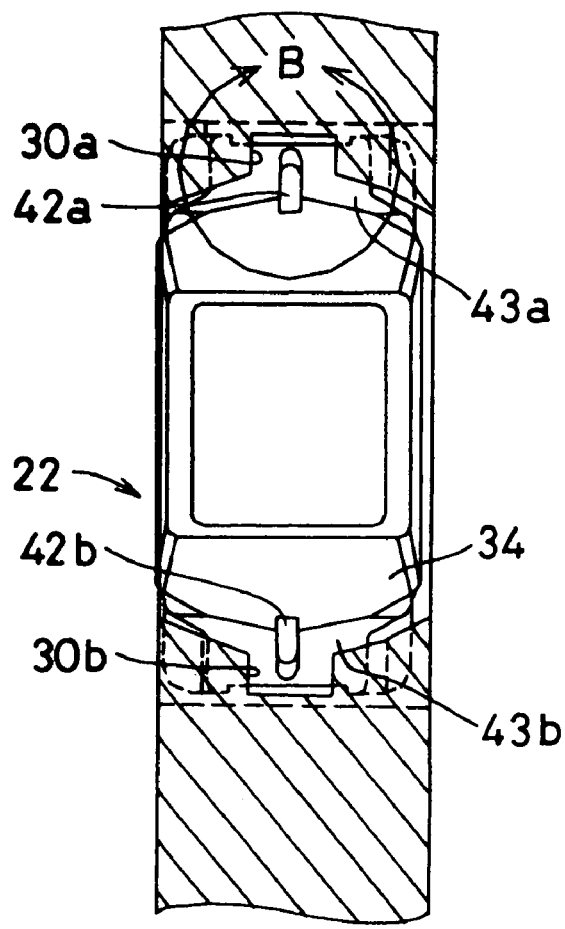
FIG. 17 is a sectional view of the position adjustment apparatus viewed from a cutting line S17-S17 in FIG. 15.
Figure 18:
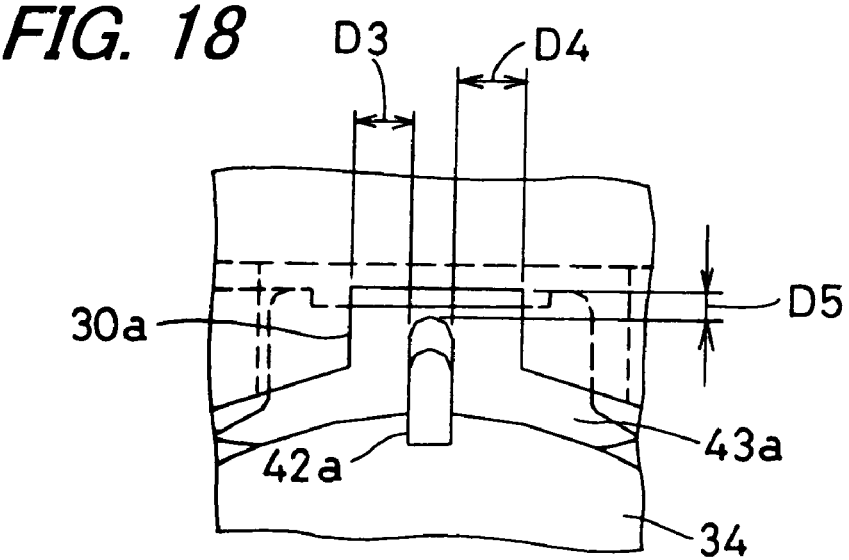
FIG. 18 is a sectional view showing a section B in FIG. 17.

FIG. 17 is a sectional view of the position adjustment apparatus 60 viewed from a cutting line S17-S17 in FIG. 15. FIG. 18 is a sectional view showing a section B in FIG. 17. In FIG. 18, for ease of understanding of the illustration, hatching in the housing 21 is omitted. As the guide piece 42 and the guide groove 30, opposed surfaces thereof are arranged so as to be spaced apart from each other by predetermined clearances D3 to D5 in a state in which the light source unit 22 is held in the chuck portion 63. The clearances D3 to D5 are assumed to be clearances which can be subjected to the in-plane adjustment and clearances of a degree which can be subjected to the tilt adjustment around a light-emitting point of a laser beam in the light source 33.

When an optical axis of light from the light source unit 22 is adjusted so as to be aligned with the axis of the collimator lens 31 according to the position adjustment including the in-plane adjustment and the tilt adjustment and the adjustment is completed, the light source unit 22 is fixed in the housing 21. The light source unit 22 is fixed in the housing 21 by fixing means 71 of the position adjustment apparatus 60.

The fixing means 71 is means for applying a fixing material 72 such as an adhesive onto the housing 21 and the light source unit 22. More specifically, an adhesive of a low contraction coefficient is used as the fixing material 72. In addition, the fixing material 72 has flow properties before it is cured. By using the adhesive of a low contraction coefficient as the fixing material 72 in this way, contraction of the fixing material 72 at the time of curing can be made as small as possible, and the light source unit 22 after position adjustment is prevented from being displaced with respect to the housing 21. Consequently, the light source unit 22 can be fixed to the housing 21 surely in a desired state of disposition.

In addition, cutout portions 55a and 55b may be formed in the housing 21 such that the fixing material 72, which is indicated by shading in FIGS. 1 and 10, can be applied efficiently. The cutout portions 55a and 55b are portions obtained by cutting out a part of an edge part on one side in the third axial direction Y of the guide groove 30 and pierce through the edge part along the third axial direction Y. By applying an adhesive from these cutout portions 55a and 55b, the adhesive can be filled in a gap between the guide groove 30 and the guide piece 42, and the housing 21 and the light source unit 22 can be fixed firmly and surely. Resin and grease with a better heat radiation property than the air, solder and metal paste, and the like may be used in combination with or as replacement of the adhesive.

Figure 19:
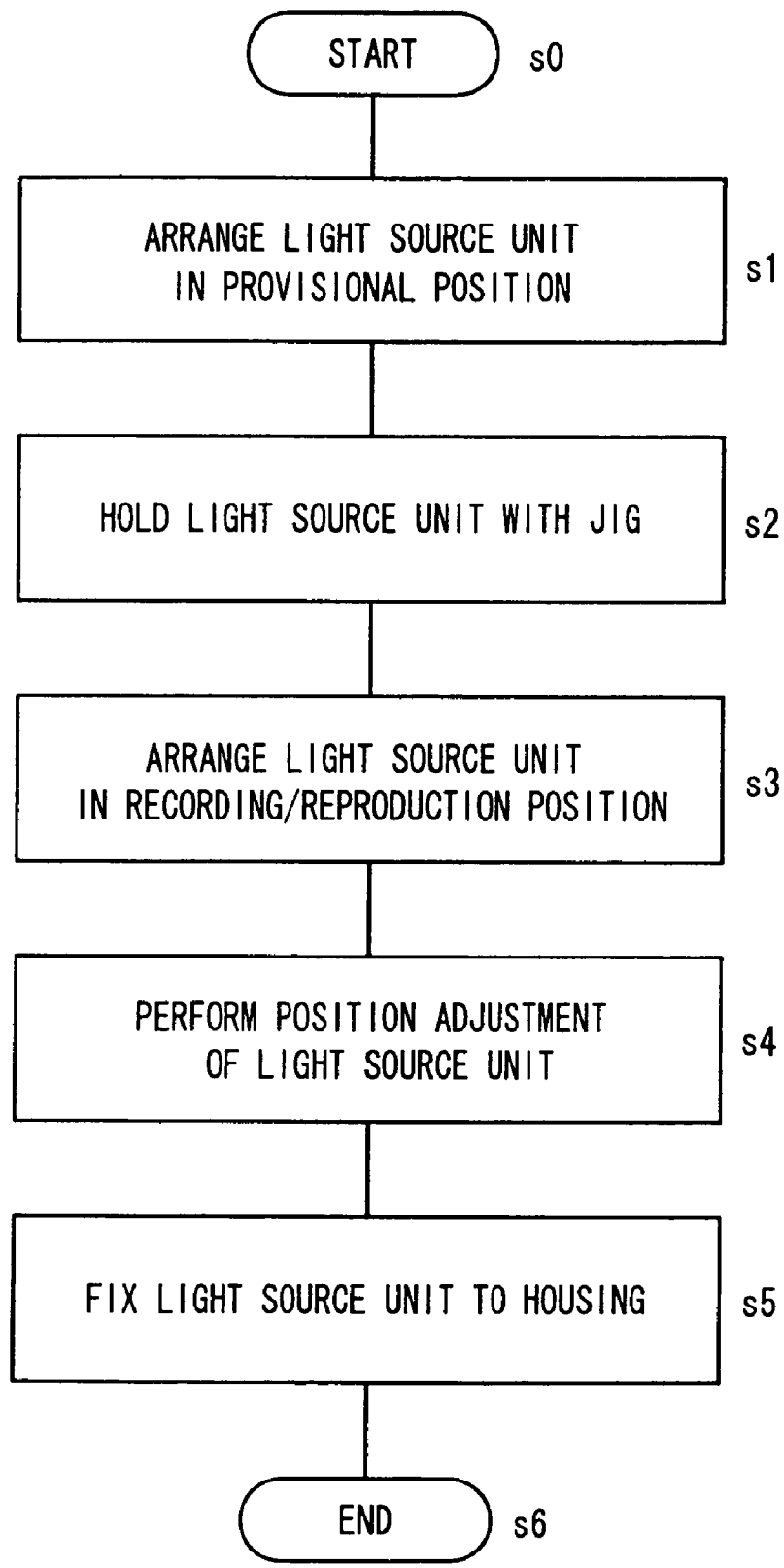
FIG. 19 is a flowchart showing adjustment procedures on the basis of a position adjustment method of the light source unit.

FIG. 19 is a flowchart showing adjustment procedures based upon the position adjustment method for the light source unit 22. An operator adjust a position of the chuck portion 63 with respect to the housing 21 in accordance with the adjustment procedure based upon the position adjustment method of the invention to thereby adjust a position of the light source unit 22 with respect to the housing 21. In step s0, when the adjustment procedures for the light source unit 22 are started by the operator, the procedure proceeds to step s1.

In step s1, the operator arranges the light source unit 22 in the provisional position 47. In step s1, the operator displaces the pressing means 68 of the position adjustment apparatus 60 in the approaching direction Z2 to resiliently press the light source unit 22 from the opposite side of the housing 21. The light source unit 22 pressed by the pressing means 68 is displaced in the approaching direction Z2, whereby the light source unit 22 is arranged in the provisional position 47 where the opposed surface 43 and the reference plane 28 are brought into abutment against each other. When the light source unit 22 is arranged in the provisional position 47 in step s1, the procedure proceeds to step s2.

In step s2, the operator holds the light source unit 22 using the jig 61. In step s2, the operator holds the light source unit 22 which is in the provisional position 47 using the chuck portion 63 of the jig 61 in a state in which the light source unit 22 is resiliently pressed by the pressing means 68. In the state in which the light source unit 22 is in the provisional position 47, the chuck portion 63 is arranged in the advanced position 65. At this point, the chuck fitting portion 69 of the chuck portion 63 is arranged in a position where the chuck fitting portion 69 is opposed to the light source fitting portion 52 of the light source unit 22.

The operator displaces the chuck portion 63 in a direction proximate to the light source unit 22 with respect to the third axial direction Y. Consequently, the light source unit 22 is nipped by the chuck portion 63 from both sides of the third axial direction Y. At this time, since the light source fitting portion 52 of the light source unit 22 is fitted in the chuck fitting portion 69 of the chuck portion 63, the light source unit 22 is gripped surely by the chuck portion 63.

In addition, after the light source unit 22 is held by the chuck portion 63, the pressing means 68 may be away from the light source unit 22 to release the pressed state, or the pressed state may be maintained. When the light source unit 22 is held by the jig 61 in step s2, the procedure proceeds to step s3.

In step s3, the operator arranges the light source unit 22 in the recording/reproduction position 48. In step s3, the operator displaces the chuck portion 63 in the advanced position 65 in the withdrawing direction Z1 to arrange the chuck portion 63 in the retracted position 66. When the chuck portion 63 is displaced from the advanced portion 65 toward the retracted position 66, the light source unit 22 which is in the provisional position 47 is displaced in the withdrawing direction Z1 following the displacement of the chuck portion 63.

When the chuck portion 63 is arranged in the retracted position 66, the light source unit 22 is displaced from the provisional position 47 and arranged in the recording/reproduction position 48. In the recording/reproduction position 48, as described above, the light source unit 22 is arranged in the position where the opposed surface 43 is apart from the reference plane 28 by the retraction distance D2. When the light source unit 22 is arranged in the recording/reproduction position 48 in step s3, the procedure proceeds to step s4.

In step s4, the operator displaces the chuck portion 63 in the second and the third axial directions X and Y as well as the first to the third displacement directions θ1 to θ3 to perform the position adjustment including the in-plane adjustment and the tilt adjustment. By displacing the chuck portion 63 in the second and the third axial directions X and Y as well as the first displacement direction θ1, the in-plane adjustment of the light source unit 22 is performed. In addition, by angularly displacing the chuck portion 63 in the second and the third displacement directions θ2 and θ3, the tilt adjustment of the light source unit 22 is performed.

According to the in-plane adjustment, a position of the chuck portion 63 with respect to the housing 21 is adjusted. Consequently, the light source unit 22 is displaced with respect to the housing 21 such that a desired optical axis, that is, the axis of the collimator lens 31 passes a light-emitting point of light which is a central position of the light-emitting portion 35. A position of the chuck portion 63 with respect to the housing 21 is adjusted by the tilt adjustment. Consequently, the light source unit 22 is displaced with respect to the housing 21 such that an optical axis of light from the light source unit 22 is in parallel with the reference axis L21, that is, the axis of the collimator lens 31.

By performing the in-plane adjustment and the tilt adjustment in combination, a position of the chuck portion 63 with respect to the housing 21 is adjusted, and the light source unit 22 can be arranged such that the optical axis thereof is aligned with the axis of the collimator lens 31. When the position adjustment of the light source unit 22 is performed in step s4, the procedure proceeds to step s5.

In step s5, the operator fixes the light source unit 22 to the housing 21. In step s5, the operator applies the fixing material 72 such as an adhesive to the light source unit 22 after the position adjustment using the fixing means 71 of the position adjustment apparatus 60 and fixes the light source unit 22 to the housing 21 with this fixing material 72. Consequently, the light source unit 22 is fixed to the housing 21 via the fixing material 72.

When the light source unit 22 is fixed to the housing 21 in step s5, the procedure proceeds to step s6 to end all the procedures. In step s5, for example, a resin material or the like having a heat transfer property may be used in combination with the adhesive as the fixing material 72. In the adjustment procedures in step s0 to s6, before the adjustment procedures ends in step s6, a step of providing at least one of a heat transfer material 75 to be described later and a heat radiation member may be further included.

According to the embodiment, by adjusting a positional relation between the chuck portion 63 holding the light source unit 22 and the housing 21, a positional relation between the light source unit 22 and the housing 21 can be adjusted without adjusting a positional relation between the chuck portion 63 and the jig 61 or a positional relation between the chuck portion 63 and the light source unit 22. In this way, an object of the position adjustment is only the set of the chuck portion 63 and the housing 21. Consequently, the adjustment work for a position of an optical axis of light from the light source unit 22 can be facilitated.

Moreover, since it is unnecessary to adjust a position of an optical axis in a state in which the light source unit 22 is brought into contact with the housing 21, for example, it is unnecessary to form surfaces opposed to each other of the light source unit 22 and the housing 21 as curved surfaces requiring high processing accuracy, and structures of the light source unit 22 and the housing 21 can be simplified. In addition, since the optical axis is adjusted to a desired position, recording or reproduction of information by the optical pickup apparatus 20 can be performed preferably.

In addition, according to the embodiment, the retracted position 66 is in the recording/reproduction position 48 which is set in advance with respect to the housing 21, and a distance between the recording medium and the light source unit 22 is a distance at the time when information is recorded or reproduced. By displacing the light source unit 22 following displacement of the chuck portion 63 to the retracted position 66 in this way, in addition to the position adjustment of an optical axis, a spot shape of light can be adjusted such that light from the light source unit 22 is narrowed down on the recording medium. Consequently, the adjustment work of a position of the light source unit 22 can be further facilitated.

In addition, according to the embodiment, the light source unit 22 held in the chuck portion 63 in the retracted position 66 is fixed to the housing 21 by the fixing means 71 using the fixing material 72. Consequently, the light source unit 22 can be fixed to the housing 21 in a state in which a position of an optical axis is adjusted, and the optical pickup apparatus 20 with high convenience can be realized.

In addition, according to the embodiment, since the light source unit 22 is resiliently pressed by the pressing means 68, the light source unit 22 is prevented from being pressed undesirably, and damage to and deformation of the light source unit 22 can be prevented. Moreover, the light source unit 22 can be gripped by the chuck portion 63 in a state in which positional deviation of the light source unit 22 which is in the provisional position 47 is prevented by the pressing means 68.

In addition, according to the embodiment, the light source unit 22 is gripped by the chuck portion 63 in a state in which the light source unit 22 is positioned by the light source fitting portion 52 provided in the light source unit 22. Consequently, since a positional relation between the light source unit 22 and the jig 61 is kept constant, a position of an optical axis can be adjusted preferably by adjusting a position of the light source unit 22 with respect to the housing 21.

In addition, since it is unnecessary to form surfaces opposed to each other of the light source unit 22 and the housing 21 as curved surfaces requiring high processing accuracy and to bring the surfaces into sliding contact with each other in order to adjust a tilt of an optical axis of the light source unit, a structure of the optical pickup apparatus 20 can be simplified. Consequently, from the viewpoints of processing accuracy and the number of components, reduction in costs can be realized. Therefore, the optical pickup apparatus 20 with high convenience can be realized.

In addition, according to the embodiment, the light source fitting portion 52 is arranged in an area formed by projecting the housing 21 on the reference axis L21. Consequently, the light source fitting portion 52 is prevented from being arranged in a position further projected than the housing 21 after the position adjustment of an optical axis. Therefore, the optical pickup apparatus 20 with high convenience can be realized by, for example, preventing a thickness of the entire apparatus from increasing.

In addition, according to the embodiment, the guide piece 42 for relatively positioning the light source unit 22 and the housing 21 is provided in the light source unit 22. Since a position of the light source unit 22 with respect to the housing 21 is adjusted in a state in which the positions of the light source unit 22 and the housing 21 are decided relatively by the guide piece 42 in this way, workability at the time of adjustment can be improved.

Further, according to the embodiment, since the guide piece 52 is arranged extending in the first axial direction Z along the reference axis L21, the light source unit 22 can be displaced in the first axial direction Z to be arranged in the provisional position 47 and the recording/reproduction position 48 retracted from the housing 21.

Moreover, according to the embodiment, the guide piece 42 positions the light source unit 22 with respect to the housing 21 such that the light source unit 22 is angularly displaceable around an axis crossing the reference axis L21. Consequently, in a state in which the light source unit 22 is positioned with respect to the housing 21, in addition to the displacement in the direction along the reference axis L21, the light source unit 22 can be angularly displaced around the axis crossing the reference axis L21 to adjust a position with respect to the housing 21. Therefore, a tilt of an optical axis with respect to the reference axis L21 can be adjusted.

Figure 20:
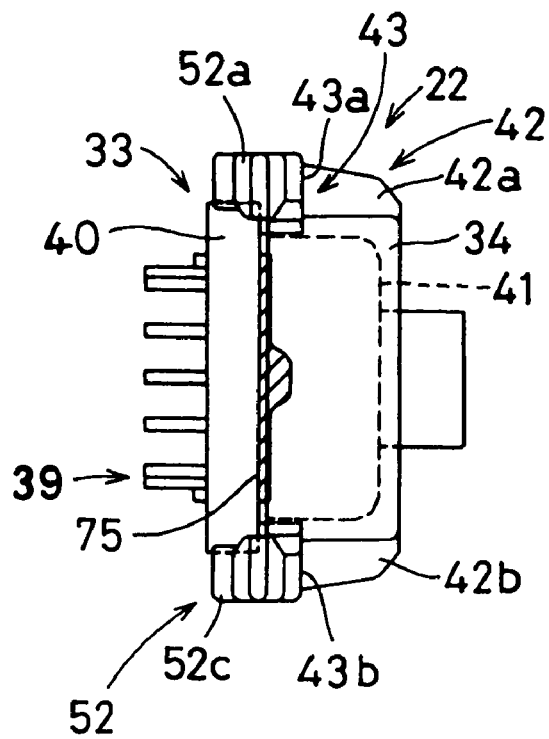
FIG. 20 is a front view showing the light source unit in which a heat transfer material is provided.
Figure 21:
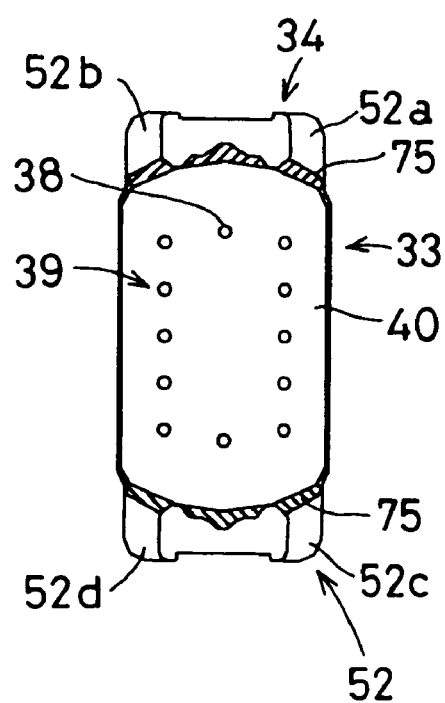
FIG. 21 is a plan view showing the light source unit in which the heat transfer material is provided.

FIG. 20 is a front view showing the light source unit 22 in which the heat transfer material 75 is provided. FIG. 21 is a plan view showing the light source unit 22 in which the heat transfer material 75 is provided. In FIGS. 20 and 21, for ease of illustration, the heat transfer material 75 is indicated by shading. The optical pickup apparatus 20 of the embodiment shown in FIGS. 1 to 19 has a structure in which an optical axis can be arranged in a desired position, and this structure can attain high convenience. In addition to this structure, the optical pickup apparatus 20 may be constituted to have means with which a high heat radiation property can be attained.

In the optical pickup apparatus 20, since the light source unit 22 is fixed in the air, more specifically, the light source unit 22 is not directly brought into contact with the housing, it is likely that a heat radiation property declines. In addition, the light source unit 22 including the light source 33 has an extremely high temperature when writing, that is, recording of information is performed with respect to, in particular, optical recording media such as a DVD and a CD. Therefore, it is necessary to constitute the light source unit 22 so as to discharge heat generated from the light source 33 to the outside of the light source 33. Examples of means or a method for efficient heat radiation include reducing a thermal resistance of a material, to which heat is transmitted from the light source 33, as much as possible and, in order to facilitate transmission of heat from the light source 33 to another material in contact with the light source 33, increasing an area to which heat is transmitted and a contact area between the materials as much as possible.

The optical pickup apparatus 20 is constituted so as to further include the heat transfer material 75 in addition to the above-mentioned structure in order to realize a high heat radiation property. The heat transfer material 75 is made of a material with a high heat transfer material in order to efficiently transmit heat from the light source 33 which is a source of generation of the heat to the holder 34 which is brought into contact with the light source 33. The heat transfer material 75 is filled in a gap between the light source 33 and the holder 34. The heat transfer material is realized by resin, grease or the like.

By providing the heat transfer material 75 in the gap between the light source 33 and the holder 34, in particular, a contact area between the holder 34 and the stem 40 to which heat is directly transmitted from the light-emitting portion 35 having a laser chip can be increased. Consequently, an amount of heat transfer from the light source 33 to the holder 34 can be increased, that is, a heat transfer property can be improved.

Therefore, the heat generated in the light source 33 can be discharged to the out side of the light source unit 22 efficiently, and a high heat discharge property can be realized.

According to the embodiment, even if the light source unit 22 is fixed in a state in which the light source unit 22 is retracted from the housing 21, heat generated in the light source 33 of the light source unit 22 can be transmitted to the holder 34 via the heat transfer material 75. In addition, in the case in which the light source unit 22 is fixed to the housing 21 by, for example, the fixing material 72, the heat transmitted from the light source 33 to the holder 34 as described above can be transmitted to the housing 21 via the fixing material 72. Consequently, the generated heat can be discharged from the light source unit 22 efficiently. In other words, a high heat radiation property can be attained.

Figure 22:
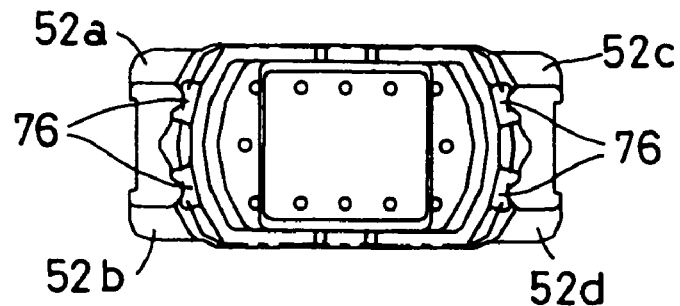
FIG. 22 is a plan view showing the light source unit in which resin reservoirs are formed.

FIG. 22 is a plan view showing the light source unit 22 in which resin reservoirs 76 are formed. The light source 33 and the holder 34 are formed integrally. However, usually, materials which are in contact with each other are not completely in contact with each other without a gap. Actually, an air layer exists between the materials due to unevenness on surfaces thereof. If there is the air layer in the gap, heat radiation efficiency is low, and heat is hard to be transmitted. Thus, by providing the resin reservoirs 76 for collecting the heat transfer material 75 and filling the heat transfer material 75 with low viscosity in the resin reservoirs 76, the air layer can be eliminated to increase the heat radiation efficiency.

The resin reservoirs 76 which are recessed portions are provided at least one of the light source 33 and the holder 34. In the embodiment, the resin reservoirs 76 are provided in the holder 34. The resin reservoirs 76 are formed in the vicinity of the surface of the holder 34 opposed to the light source 33, and the heat transfer material 75 is applied to the resin reservoirs 76. Resin of low viscosity with high flow properties is filled in the resin reservoirs 76 as the heat transfer material 75.

By forming the resin reservoirs 76 and filing the resin of low viscosity therein as the heat transfer material 75, the air layer between the light source 33 and the holder 34 can be eliminated, and a contact area between the stem 40 of the light source 33 and the holder 34 can be increased. Consequently, the heat from the light source 33 can be transmitted to the holder 34 efficiently via the stem 40 and further discharged to the outside of the light source unit 22 via the fixing material 72. Therefore, a heat radiation property can be improved. The resin reservoirs 76 may be provided in the stem 40 instead of the holder 34 or may be provided in both the holder 34 and the stem 40.

The heat transfer material provided between the light source 33 and the holder 34 and in the resin reservoirs 76 consists of a material having viscosity of 200 Pa·s or more and 400 Pa·s or less in the room temperature. In the embodiment, the room temperature is 25° C. In the case in which the viscosity is lower than 200 Pa·s or exceeds 400 Pa·s, if an impact is applied to the light source unit 22 from the outside, or temperature of the light source unit 22 rises due to heat generated from the light source 33, deficiencies occur. For example, the heat transfer material scatters or flows out from the gap. By using resin or grease having viscosity of 200 Pa·s or more and 400 Pa·s or less as the heat transfer material 75, the high heat radiation property can be maintained. In addition, an optimal adhesive is selected as the adhesive used as the fixing material 72 on the basis of a result of an impact test, a high-temperature test, and the like.

According to the embodiment, in at least one of the light source 33 and the holder 34, the resin reservoirs 76 in which the heat transfer material 75 is fitted are formed in surface portions where the light source and the holder are opposed to each other. By filling a material with high heat transmission property in the resin reservoirs 76, the heat transfer material 75 can be filled surely between the surface portions of the light source 33 and the holder 34, and the air layer generated between the surface portions can be eliminated. Consequently, the heat radiation property can be improved.

Further, according to the embodiment, the heat transfer material 75 consists of a material having viscosity of 200 Pa·s or more and 400 Pa·s or less in the room temperature. Since the material of low viscosity, which is easily filled between the light source 33 and the holder 34 and has satisfactory adhesion with the light source 33 and the holder 34, is used, the heat radiation property by the heat transfer material 75 can be improved.

Figure 23:
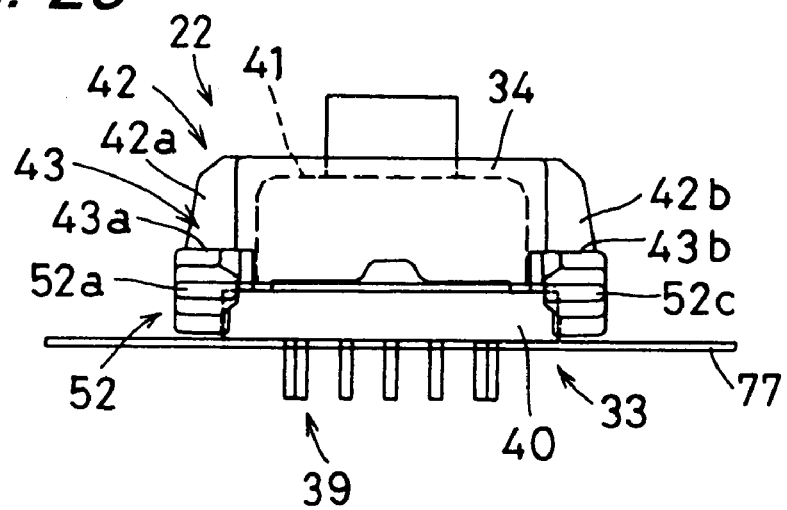
FIG. 23 is a front view showing the light source unit in which a heat radiation plate is provided.
Figure 24:
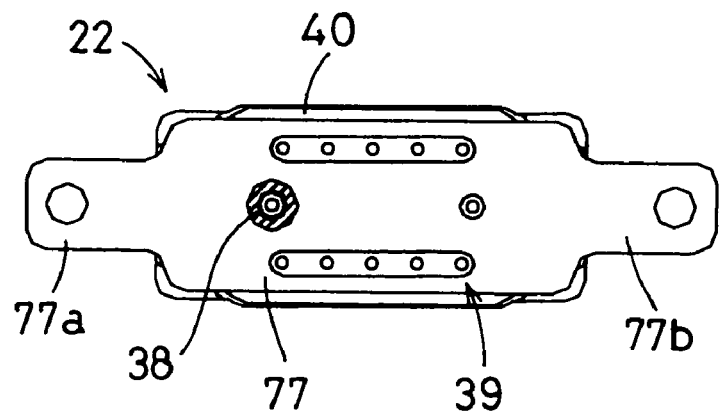
FIG. 24 is a front view showing the heat radiation plate.
Figure 25:
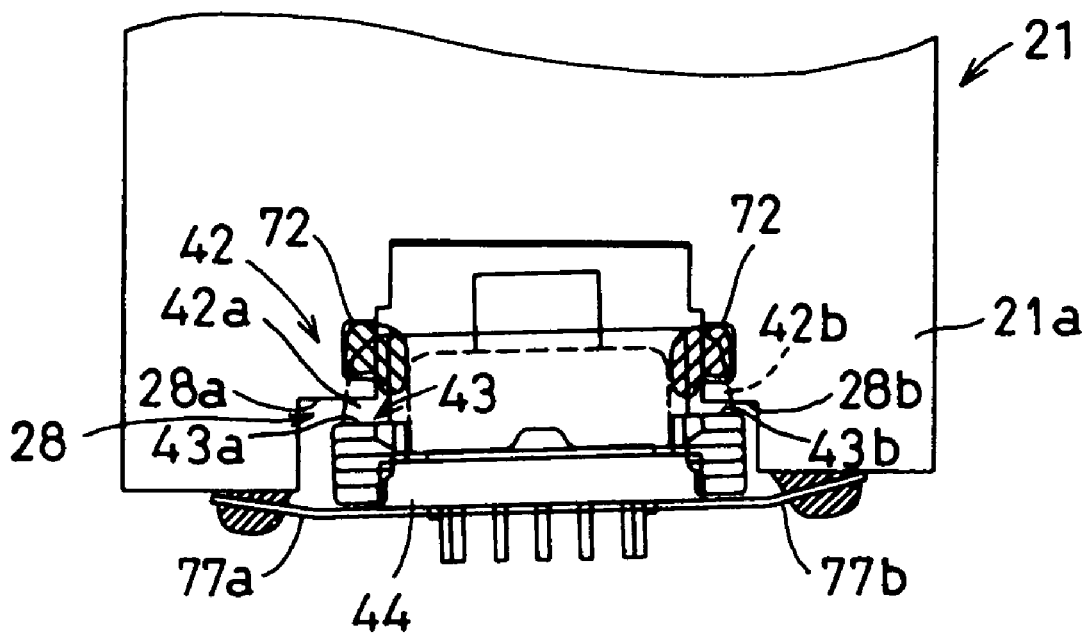
FIG. 25 is a view for explaining the heat radiation plate which is brazed to the housing.
Figure 26:
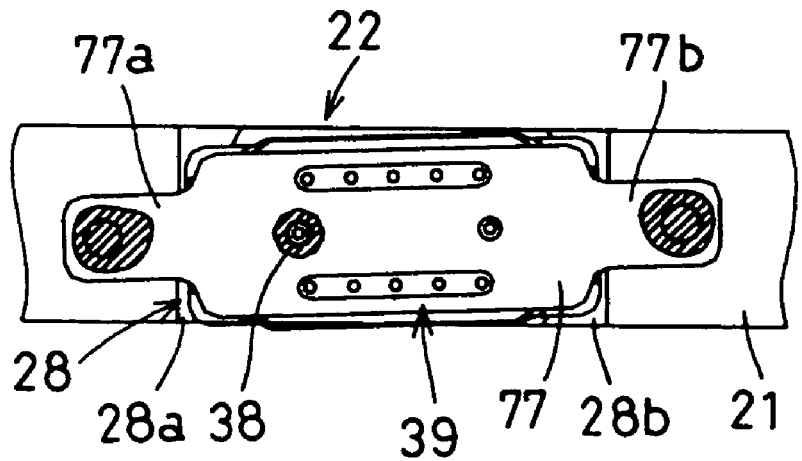
FIG. 26 is a front view showing the heat radiation plate brazed to the housing.

FIG. 23 is a front view showing the light source unit 22 in which a heat radiation plate 77 is provided. FIG. 24 is a front view showing the heat radiation plate 77. FIG. 25 is a view for explaining the heat radiation plate 77 which is brazed to the housing 21. FIG. 26 is a front view showing the heat radiation plate 77 which is brazed to the housing 21. The optical pickup apparatus 20 may be constituted so as to further include the heat radiation plate 77 in addition to the structure shown in FIGS. 1 to 22.

The heat radiation plate 77 is made of metal and is formed in a plate shape. The heat radiation plate 77 is soldered to the ground terminal 38 of the light source 33 and brazed to the housing 21. Plural through-holes are formed in the heat radiation plate 77, and various terminals of the terminal group 39 are inserted through the through holes. The heat radiation plate 77 is positioned by the ground terminal 38 and is soldered to the ground terminal 38 in a state in which the various terminals are inserted through the through-holes.

Moreover, both end portions 77a and 77b in a longitudinal direction of the heat radiation plate 77 are brazed to the one side portion 21a of the housing 21, and the heat radiation plate 77 is coupled to the housing 21. The heat radiation plate 77 has thermal conductivity. With this heat radiation plate 77, heat from the light source 33 can be guided to the housing 21 via the heat radiation plate 77, and the heat radiation property can be improved.

In addition, in the light source unit 22 after the position adjustment of an optical axis is performed, a disposition state of the light source unit 22 with respect to the housing 21 is uncertain due to component accuracy or the like, and the light source unit 22 is fixed via the fixing material 72. Therefore, it is not preferable that, for example, an external force in a specified direction is applied to the light source unit 22 by a spring member or the like, whereby a fixed load is applied thereto. Therefore, the position adjustment of an optical axis is performed in a state in which the both end portions 77a and 77b in the longitudinal direction of the heat radiation plate 77 are not brazed to the housing 21. After the position adjustment of an optical axis is completed, the light source unit 22 is fixed to the housing 21 and, thereafter, the both end portions 77a and 77b in the longitudinal direction of the heat radiation plate 77 are brazed to the housing 21.

The heat radiation plate 77 has the thermal conductivity as described above and is also flexible, and is made of phosphor bronze or the like. By forming the heat radiation plate 77 with phosphor bronze or the like, the heat radiation plate 77 can be subjected to elastic deformation flexibly, and high thermal conductivity can be realized. Consequently, when the housing 21 is brazed, the housing can be fixed so as not to apply a load to the light source unit 22 as much as possible. In addition, the heat radiation plate 77 may be coupled with the light source 33 so as to be interposed between the stem 40 and the FPC 44 or may be coupled to the light source 33 in a state in which the FPC 44 is interposed between the heat radiation plate 77 and the stem 40.

According to the embodiment, the heat radiation plate 77 of metal is soldered to the ground terminal 38 of the light source 33. This heat radiation plate 77 is further brazed to the housing 21. Consequently, heat generated in the light source 33 can be transmitted to the housing 21 via the heat radiation plate 34, and the heat radiation property can be improved.

Further, according to the embodiment, since the heat radiation plate 77 is brazed to the housing 21 after the light source unit 22 is fixed to the housing 21, the heat radiation plate 77 can be brazed to the housing 21 so as not to apply an undesirable external force to the light source unit 22. Consequently, it is possible to prevent a position of the light source 33 with respect to the housing 21 from deviating.

Moreover, according to the embodiment, the heat radiation plate 77 has thermal conductivity and is also flexible. Thus, the heat radiation property can be improved, and the heat radiation plate 77 can be fixed to the housing 21 in a properly deformed state such that an undesired external force is never applied to the light source unit 22.

Figure 27:
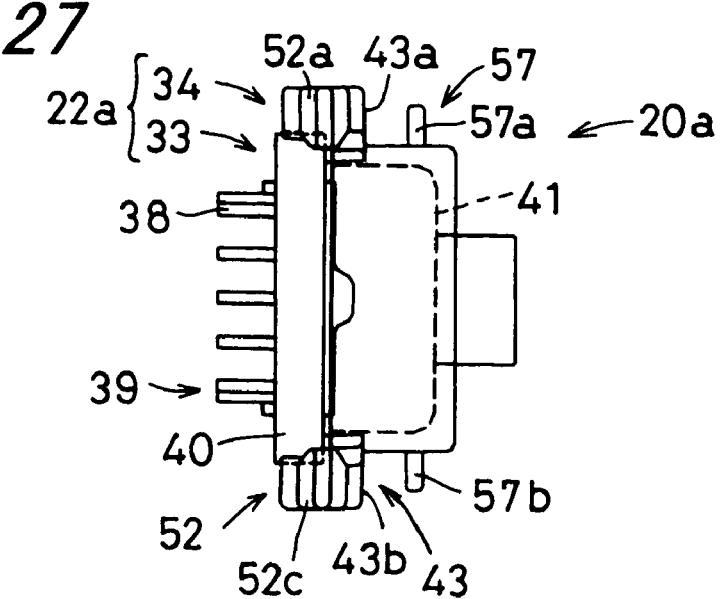
FIG. 27 is a front view showing a light source unit included in an optical pickup apparatus which is another embodiment of the invention.
Figure 28:
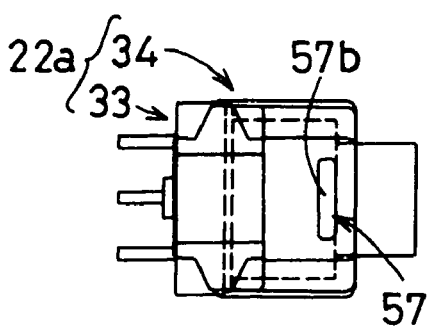
FIG. 28 is a bottom view showing the light source unit of FIG. 27.
Figure 29:
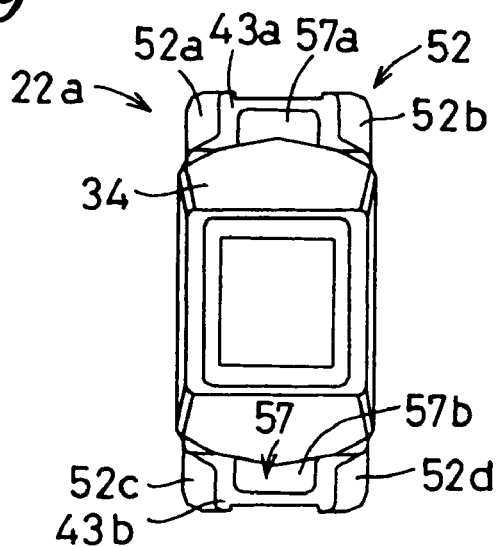
FIG. 29 is a right side view showing the light source unit of FIG. 27.

FIG. 27 is a front view showing a light source unit 22a included in an optical pickup apparatus 20a according to another embodiment of the invention. FIG. 28 is a bottom view showing the light source unit 22a of FIG. 27. FIG. 29 is a right side view showing the light source unit 22a of FIG. 27. The optical pickup apparatus 20a according to another embodiment of the invention is similar to the optical pickup apparatus 20 of the embodiment shown in FIGS. 1 to 26. Thus, the same components are denoted by the same reference numerals, and the same description will be omitted.

In the optical pickup apparatus 20 shown in FIGS. 1 to 26, the guide piece 42 is arranged extending in the direction along the reference axis L21. However, in the embodiment, guide pieces 57a and 57b provided in the light source unit 22a are formed so as to be arranged to extend in a direction perpendicular to the reference axis L21. In the following description, when at least one of the two guide pieces 57a and 57b is indicated, it may be represented as "guide piece 57".

The guide piece 57 is arranged to extend in a direction perpendicular to the reference axis L21, more specifically, in the third axial direction Y. By constituting the guide piece 57 in this way, a dimension of the holder 34 in the first axial direction Z can be reduced compared with the case in which the guide piece 57 extends in the first axial direction Z. Consequently, a wiring length of the FPC 44 can be reduced compared with the case in which the guide piece 57 extends in the first axial direction Z.

According to the embodiment, the guide piece 57 is arranged to extend in a direction perpendicular to the reference axis L21. With this guide piece 57, the light source unit 22a can also be displaced in a direction along the reference axis L21 to be arranged in the provisional position 47 and the recording/reproduction position 48 retracted from the hosing 21.

In addition, the optical pickup apparatus 20a of the embodiment may be constituted so as to include the heat transfer material 75, the resin reservoir 76, and the heat radiation plate 77 as described above. Consequently, the optical pickup apparatus 20a which facilitates position adjustment of an optical axis and has a high heat radiation property can be realized.

Figure 30:
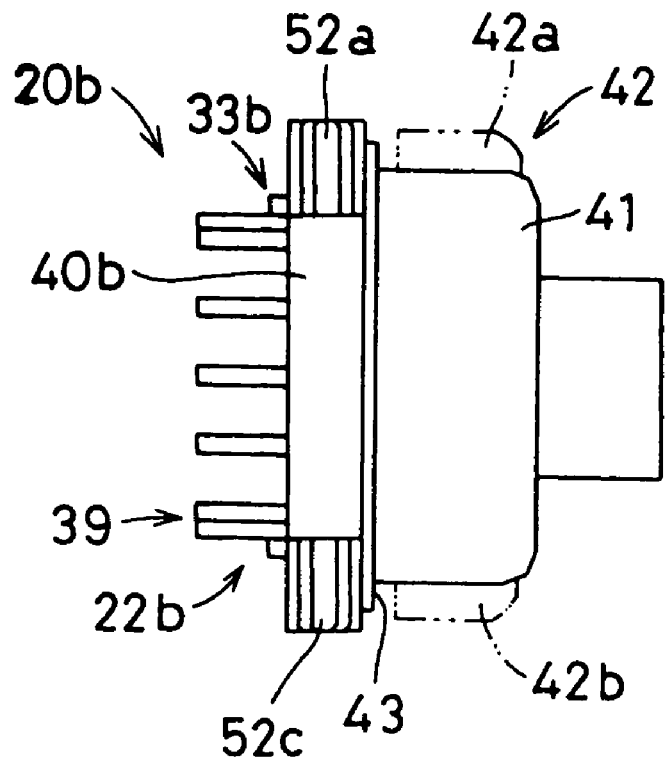
FIG. 30 is a front view showing a light source unit included in an optical pickup apparatus which is yet another embodiment of the invention.
Figure 31:
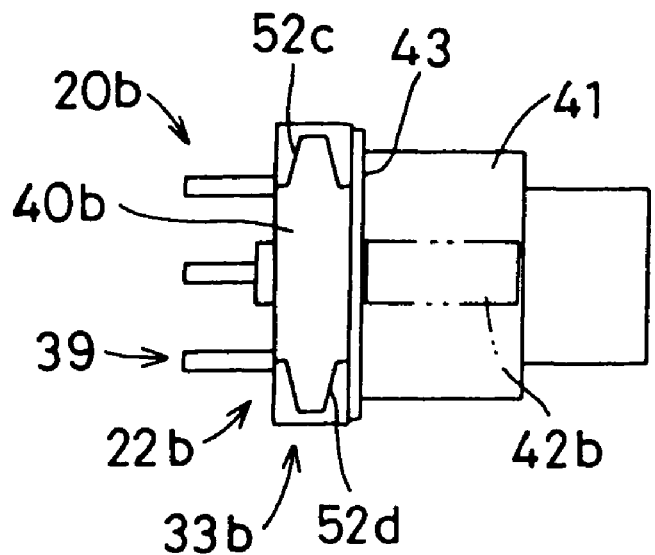
FIG. 31 is a bottom view showing the light source unit of FIG. 30.
Figure 32:
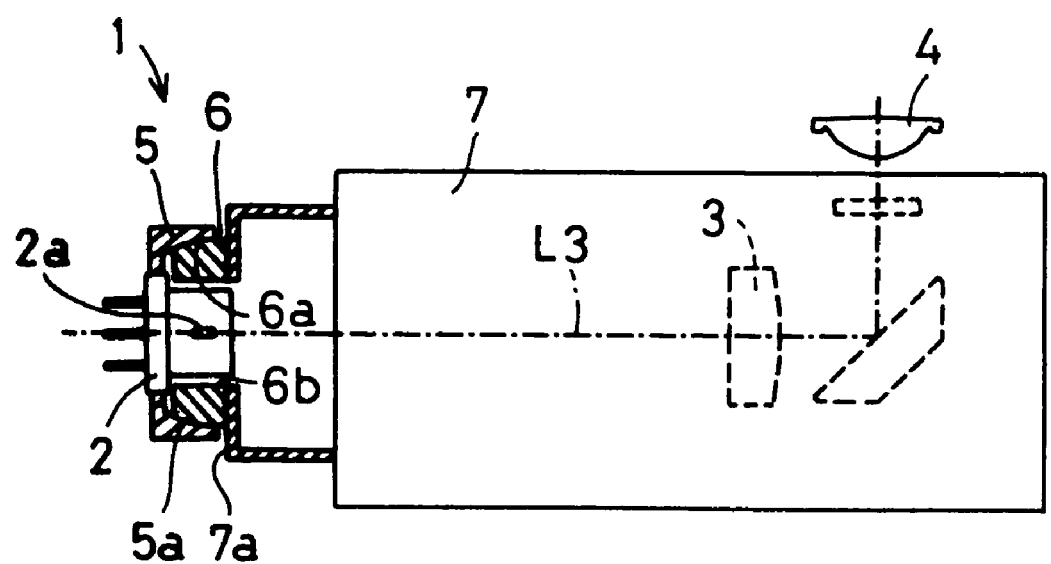
FIG. 32 is a sectional view showing an optical pickup apparatus in one related art.
Figure 33:
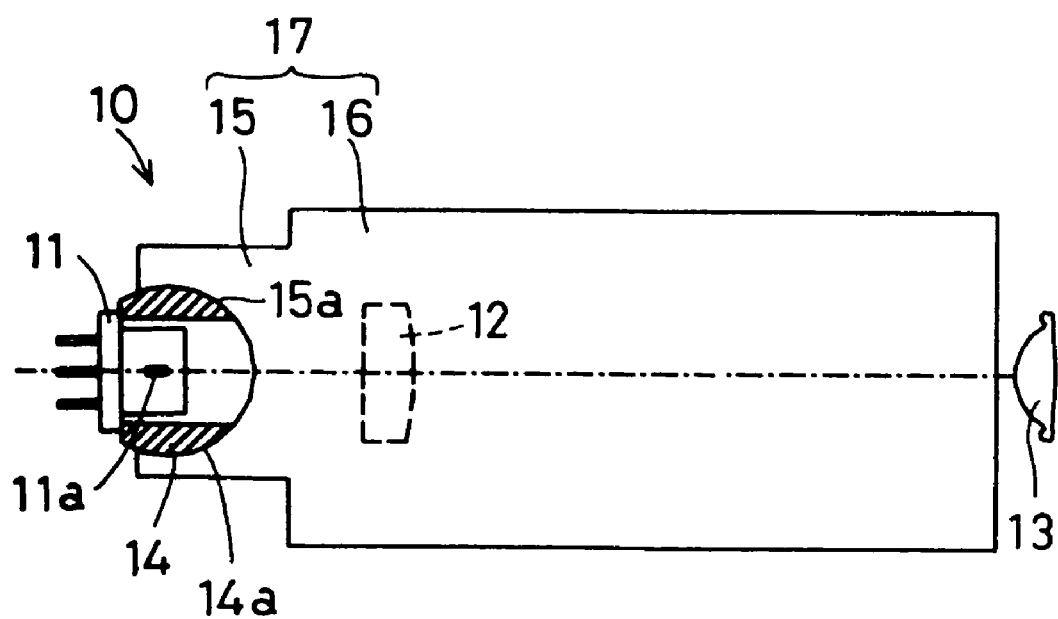
FIG. 33 is a sectional view showing an optical pickup apparatus in another related art.

FIG. 30 is a front view showing a light source unit 22b included in an optical pickup apparatus 20b which is yet another embodiment of the invention. FIG. 31 is a bottom view showing the light source unit 22b of FIG. 30. The optical pickup apparatus 20b according to still another embodiment of the invention is similar to the optical pickup apparatuses 20 and 20a of the above-mentioned embodiments. Thus, the same components are denoted by the same reference numerals, and the same description will be omitted.

In the embodiment, the light source unit 22b includes a structure not including the holder 34, that is, a light source 33b. The light source unit 22b can be constituted only by the light source 33b according to a size of a stem 40b, an amount of displacement of the light source unit 22b at the time of position adjustment of an optical axis, and the like. In such a case, the opposed surface 43 and the light source fitting portion 52 are provided in the light source 33b, more specifically, the stem 40b, and the guide piece 42 is provided in the cap 40. By constituting the light source unit 22b only with the light source 33b in this way, since the holder 34 is unnecessary, the number of components can be reduced, and reduction in costs can be realized.

The above-mentioned embodiments are only illustrative embodiments of the invention, and the structures of the embodiments may be changed within the scope of the invention. For example, structures of a light source fitting portion and a chuck fitting portion may be changed by, for example, forming the light source fitting portion in a recessed shape instead of forming it in a protruded shape, and forming the chuck fitting portion in a protruded shape.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A position adjustment apparatus for adjusting a position of a light source unit of an optical pickup apparatus which includes a housing wherein the light source unit is configured to be fixed to the housing and to record or reproduce information by irradiating a recording medium with light from the light source unit, the position adjustment apparatus comprising:

a jig having a chuck portion provided to keep a fixed positional relation with respect to the housing, to detachably hold the light source unit, and a pressing unit configured to resiliently press the light source unit which is arranged in the provisional position with respect to the housing, toward the housing, wherein the chuck portion is provided so as to be displaceable over an advanced position where the chuck portion is capable of holding the light source unit, which is arranged in a predetermined provisional position with respect to the housing, and a retracted position where the chuck portion is retracted in a direction in which the chuck portion is away from the housing along a predetermined reference axis, with respect to the advanced position, and so as to be capable of, in a state in which the chuck portion is in the retracted position, sliding and displacing the light source unit in a direction crossing the reference axis with respect to the housing and angularly displacing the light source unit around the reference axis and an axis crossing the reference axis, and wherein the chuck portion is configured to grip the light source unit when the light source unit is resiliently pressed to the housing by the pressing unit.

2. The position adjustment apparatus of claim 1, wherein the retracted position is in a recording and reproducing position which is set with respect to the housing in advance, and a distance between the recording medium and the light source unit is a distance at which recording or reproduction of information is performed.

3. The position adjustment apparatus of claim 1, further comprising a fixing unit configured to fix the light source unit which is held by the chuck portion in the retracted position, to the housing using a fixing material.

4. An optical pickup apparatus system, comprising:
a housing; and
a light source unit fixed to the housing, wherein the optical pickup apparatus is configured to record or reproduce information by irradiating a recording medium with light from the light source unit, and
a pressing unit configured to resiliently press the light source unit which is arranged in the provisional position with respect to the housing, toward the housing,
wherein the light source unit is, after being arranged in a provisional position, configured to be arranged in a position retracted from the housing using a jig having a chuck portion provided to keep a fixed positional relation with respect to the housing, for holding the light source unit, slid and displaced in a direction crossing a reference axis decided in advance in this position and displaced around the reference axis and an axis crossing the reference axis, and then fixed to the housing,
wherein the light source unit comprises an adjustment positioning unit to position the light source unit with respect to the chuck portion, and
wherein the chuck portion is configured to grip the light source unit when the light source unit is resiliently pressed to the housing by the pressing unit.

5. The optical pickup apparatus of claim 4, wherein the adjustment positioning unit is arranged in an area formed by projections of the housing along the reference axis.

6. The optical pickup apparatus of claim 4, wherein the light source unit is provided with provisional position adjusting unit to position the light source unit relative to the housing.

7. The optical pickup apparatus of claim 6, wherein the provisional position adjusting unit is arranged so as to extend in a direction along the reference axis.

8. The optical pickup apparatus of claim 6, wherein the provisional position adjusting unit is arranged so as to extend in a direction perpendicular to the reference axis.

9. The optical pickup apparatus of claim 6, wherein the provisional position adjusting unit is configured to position the light source unit with respect to the housing such that the light source unit is angularly displaceable around the axis crossing the reference axis.

10. The optical pickup apparatus of claim 4, wherein the light source unit includes a light source and a holder for holding the light source, and a heat transfer material made of a material with high heat transfer property is provided between the light source and the holder.

11. The optical pickup apparatus of claim 10, wherein in at least one of the light source and the holder, a recessed portion, in which the heat transfer material is fitted, is formed in at least one surface portion where the light source and the holder are opposed to each other.

12. The optical pickup apparatus of claim 10, the heat transfer material is made of a material with a viscosity of 200 Pa·s or more and 400 Pa·s or less at room temperature.

13. The optical pickup apparatus of claim 10, further comprising a heat radiation member of metal which is soldered to a ground terminal of the light source and brazed to the housing.

14. The optical pickup apparatus of claim 13, wherein after the light source unit is fixed to the housing with a position adjustment thereof with respect to the reference axis, the heat radiation member is brazed and fixed to the housing in a state in which the heat radiation member is soldered to the ground terminal of the light source.

15. The optical pickup apparatus of claim 13, wherein the heat radiation member has thermal conductivity and is flexible.

16. A position adjustment method for adjusting a position of a light source unit of an optical pickup apparatus which includes a housing and wherein the light source unit is configured to be fixed to the housing and to record or reproduce information by irradiating a recording medium with light from the light source unit, the position adjustment method comprising:
providing a jig having a chuck portion provided to keep a fixed positional relation with respect to the housing, and to detachably hold the light source unit, the chuck portion being provided so as to be displaceable over an advanced position where the chuck portion is configured to hold the light source unit, which is arranged in a predetermined provisional position with respect to the housing, and a retracted position where the chuck portion is retracted in a direction in which the chuck portion is away from the housing along a predetermined reference axis, with respect to the advanced position;
resiliently pressing the light source unit toward the housing using a pressing unit configured to resiliently press the light source unit toward the housing;
arranging the light source unit in the provisional position;
gripping the light source unit arranged in the provisional position using the chuck portion;
displacing and retracting the light source unit from the provisional position in a direction being away from the housing by arranging the chuck portion in the retracted position using the jig; and
sliding and displacing the light source unit in a direction crossing the reference axis with respect to the housing and angularly displacing the light source unit around the reference axis and an axis crossing the reference axis, in a state in which the chuck portion is in the retracted position.

17. The position adjustment method of claim 16, wherein the retracted position is in a recording and reproducing position which is set with respect to the housing in advance, and a distance between the recording medium and the light source unit is a distance at which recording or reproduction of information is to be performed.

18. The position adjustment method of claim 16, further comprising fixing the light source unit, which is held by the chuck portion in the retracted position, to the housing using a fixing material.

* * * * *